United States Patent
Li et al.

(10) Patent No.: US 10,911,377 B1
(45) Date of Patent: Feb. 2, 2021

(54) USING STATEFUL TRAFFIC MANAGEMENT DATA TO PERFORM PACKET PROCESSING

(71) Applicant: Barefoot Networks, Inc., Santa Clara, CA (US)

(72) Inventors: Yi Li, Fremont, CA (US); Michael Feng, Mountain View, CA (US); Anurag Agrawal, Santa Clara, CA (US); Jeongkeun Lee, Mountain View, CA (US); Changhoon Kim, Palo Alto, CA (US); Remy Chang, Milpitas, CA (US)

(73) Assignee: Barefoot Networks, Inc., Santa Clara, CA (US)

(*) Notice: Subject to any disclaimer, the term of this patent is extended or adjusted under 35 U.S.C. 154(b) by 0 days.

(21) Appl. No.: 15/835,238

(22) Filed: Dec. 7, 2017

Related U.S. Application Data

(60) Provisional application No. 62/535,934, filed on Jul. 23, 2017, provisional application No. 62/537,917, filed on Jul. 27, 2017.

(51) Int. Cl.
*H04L 12/935* (2013.01)
*H04L 12/863* (2013.01)
(Continued)

(52) U.S. Cl.
CPC ........ *H04L 49/3063* (2013.01); *H04L 45/245* (2013.01); *H04L 47/32* (2013.01);
(Continued)

(58) Field of Classification Search
CPC ....... H04L 43/16; H04L 45/245; H04L 47/11; H04L 47/12; H04L 47/125; H04L 47/30;
(Continued)

(56) References Cited

U.S. PATENT DOCUMENTS 5,243,596 A 9/1993 Port et al.
5,642,483 A 6/1997 Topper
(Continued)

FOREIGN PATENT DOCUMENTS

EP 3229424 A4 * 12/2017

OTHER PUBLICATIONS

Bosshart et al., Forwarding Metamorphosis: Fast Programmable Match-Action Processing in Hardware for SDN; Aug. 16, 2013; SIGCOMM '13 Proceedings of the ACM SIGCOMM 2013 conference on SIGCOMM, pp. 99-110 (Year: 2013).*

(Continued)

*Primary Examiner* — Eric Nowlin
(74) *Attorney, Agent, or Firm* — Compass IP Law PC

(57) ABSTRACT

Some embodiments provide a method for an ingress packet processing pipeline of a network forwarding integrated circuit (IC). The ingress packet processing pipeline is for receiving packets from a port of the network forwarding IC and processing the packets to assign different packets to different queues of a traffic management unit of the network forwarding IC. The method receives state data from the traffic management unit. The method stores the state data in a stateful table. The method assigns a particular packet to a particular queue based on the state data received from the traffic management unit and stored in the stateful table.

21 Claims, 23 Drawing Sheets

(51) Int. Cl.
*H04L 12/823* (2013.01)
*H04L 12/933* (2013.01)
*H04L 12/709* (2013.01)

(52) U.S. Cl.
CPC ........ *H04L 47/628* (2013.01); *H04L 47/6255* (2013.01); *H04L 49/109* (2013.01)

(58) Field of Classification Search
CPC ..... H04L 47/32; H04L 47/50; H04L 47/6255; H04L 47/628; H04L 49/109; H04L 49/3063
See application file for complete search history.

(56) References Cited

U.S. PATENT DOCUMENTS

| | | | |
|---|---|---|---|
| 5,784,003 | A | 7/1998 | Dahlgren |
| 6,442,172 | B1 | 8/2002 | Wallner et al. |
| 6,735,679 | B1 | 5/2004 | Herbst et al. |
| 6,976,149 | B1 | 12/2005 | Brandt et al. |
| 6,980,552 | B1* | 12/2005 | Belz ............ H04L 47/10 370/392 |
| 7,046,685 | B1* | 5/2006 | Matsuoka ...... H04L 12/5601 370/409 |
| 7,177,276 | B1* | 2/2007 | Epps ........... H04L 47/10 370/230 |
| 7,492,714 | B1 | 2/2009 | Liao et al. |
| 7,499,941 | B2 | 3/2009 | Michaeli et al. |
| 7,643,486 | B2* | 1/2010 | Belz ............ H04L 47/10 370/392 |
| 7,889,750 | B1 | 2/2011 | Parker |
| 7,961,734 | B2 | 6/2011 | Anwar et al. |
| 8,077,611 | B2 | 12/2011 | Bettink et al. |
| 8,638,793 | B1 | 1/2014 | Ben-Mayor et al. |
| 8,738,860 | B1 | 5/2014 | Griffin et al. |
| 8,971,338 | B2 | 3/2015 | Mishra et al. |
| 9,055,004 | B2 | 6/2015 | Edsall et al. |
| 9,112,818 | B1 | 8/2015 | Arad et al. |
| 9,124,644 | B2 | 9/2015 | Patel et al. |
| 9,258,224 | B2 | 2/2016 | Bosshart et al. |
| 9,276,846 | B2 | 3/2016 | Goyal et al. |
| 9,686,209 | B1 | 6/2017 | Arad et al. |
| 9,712,439 | B2 | 7/2017 | Bosshart et al. |
| 9,755,932 | B1 | 9/2017 | Godbole et al. |
| 10,009,276 | B2 | 6/2018 | Bosshart et al. |
| 10,044,646 | B1 | 8/2018 | Detwiler |
| 10,091,137 | B2 | 10/2018 | Tran et al. |
| 10,135,734 | B1 | 11/2018 | Singh et al. |
| 10,341,242 | B2* | 7/2019 | Srinivasan ...... H04L 45/54 |
| 10,412,018 | B1* | 9/2019 | Feng ........... H04L 49/30 |
| 2001/0043611 | A1 | 11/2001 | Kadambi et al. |
| 2002/0136163 | A1 | 9/2002 | Kawakami et al. |
| 2002/0172210 | A1 | 11/2002 | Wolrich et al. |
| 2003/0009466 | A1 | 1/2003 | Ta et al. |
| 2003/0046414 | A1 | 3/2003 | Pettyjohn et al. |
| 2003/0046429 | A1 | 3/2003 | Sonksen |
| 2003/0107996 | A1 | 6/2003 | Black et al. |
| 2003/0118022 | A1 | 6/2003 | Kulkarni et al. |
| 2003/0154358 | A1 | 8/2003 | Seong et al. |
| 2003/0219026 | A1* | 11/2003 | Sun ............ H04L 47/20 370/412 |
| 2004/0042477 | A1 | 3/2004 | Bitar et al. |
| 2004/0105384 | A1 | 6/2004 | Gallezot et al. |
| 2004/0213156 | A1* | 10/2004 | Smallwood ...... H04L 47/10 370/232 |
| 2005/0013251 | A1 | 1/2005 | Wang et al. |
| 2005/0041590 | A1 | 2/2005 | Olakangil et al. |
| 2005/0078651 | A1 | 4/2005 | Lee et al. |
| 2005/0120173 | A1 | 6/2005 | Minowa |
| 2005/0243852 | A1 | 11/2005 | Bitar et al. |
| 2006/0039374 | A1* | 2/2006 | Belz ............ H04L 47/10 370/389 |
| 2006/0050690 | A1 | 3/2006 | Epps et al. |
| 2006/0117126 | A1 | 6/2006 | Leung et al. |
| 2006/0277346 | A1 | 12/2006 | Doak et al. |
| 2007/0008985 | A1 | 1/2007 | Lakshmanamurthy et al. |
| 2007/0055664 | A1 | 3/2007 | Michaeli et al. |
| 2007/0104102 | A1 | 5/2007 | Opsasnick |
| 2007/0104211 | A1 | 5/2007 | Opsasnick |
| 2007/0153796 | A1 | 7/2007 | Kesavan et al. |
| 2007/0195761 | A1 | 8/2007 | Tatar et al. |
| 2007/0208876 | A1 | 9/2007 | Davis |
| 2007/0230493 | A1 | 10/2007 | Dravida et al. |
| 2007/0280277 | A1 | 12/2007 | Lund et al. |
| 2008/0130670 | A1 | 6/2008 | Kim et al. |
| 2009/0096797 | A1 | 4/2009 | Du et al. |
| 2009/0106523 | A1 | 4/2009 | Steiss |
| 2009/0180475 | A1 | 7/2009 | Hashimoto |
| 2010/0128735 | A1 | 5/2010 | Lipschutz |
| 2010/0150164 | A1* | 6/2010 | Ma ............. H04L 12/4625 370/412 |
| 2010/0182920 | A1* | 7/2010 | Matsuoka ...... H04L 43/00 |
| 2011/0149960 | A1 | 6/2011 | Gutiérrez |
| 2012/0177047 | A1 | 7/2012 | Roitshtein |
| 2013/0315054 | A1 | 11/2013 | Shamis et al. |
| 2014/0033489 | A1 | 2/2014 | Kawashima |
| 2014/0043974 | A1 | 2/2014 | Kwan et al. |
| 2014/0204943 | A1 | 7/2014 | Palmer |
| 2014/0241359 | A1 | 8/2014 | Bosshart et al. |
| 2014/0241361 | A1 | 8/2014 | Bosshart et al. |
| 2014/0241362 | A1 | 8/2014 | Bosshart et al. |
| 2014/0244966 | A1 | 8/2014 | Bosshart et al. |
| 2014/0321473 | A1 | 10/2014 | Chen et al. |
| 2014/0328180 | A1 | 11/2014 | Kim et al. |
| 2014/0328344 | A1 | 11/2014 | Bosshart |
| 2014/0334489 | A1 | 11/2014 | Bosshart et al. |
| 2015/0178395 | A1 | 6/2015 | Tiwari et al. |
| 2015/0222560 | A1* | 8/2015 | Kakadia ........ H04L 47/50 370/235 |
| 2016/0019161 | A1 | 1/2016 | Patel et al. |
| 2016/0173383 | A1 | 6/2016 | Liu et al. |
| 2016/0191406 | A1* | 6/2016 | Xiao ........... H04L 12/6418 370/235 |
| 2016/0330127 | A1 | 11/2016 | Kim et al. |
| 2016/0330128 | A1 | 11/2016 | Wang |
| 2017/0048144 | A1* | 2/2017 | Liu ............. H04L 12/413 |
| 2017/0053012 | A1 | 2/2017 | Levy et al. |
| 2017/0063690 | A1 | 3/2017 | Bosshart |
| 2017/0064047 | A1* | 3/2017 | Bosshart ........ H04L 69/22 |
| 2017/0075692 | A1 | 3/2017 | Naresh et al. |
| 2017/0093707 | A1 | 3/2017 | Kim et al. |
| 2017/0126588 | A1 | 5/2017 | Anand et al. |
| 2017/0134282 | A1 | 5/2017 | Agarwal et al. |
| 2017/0134310 | A1 | 5/2017 | Koladi et al. |
| 2017/0142000 | A1 | 5/2017 | Cai et al. |
| 2017/0180273 | A1 | 6/2017 | Daly et al. |
| 2017/0208015 | A1 | 7/2017 | Volkening et al. |
| 2017/0222881 | A1 | 8/2017 | Holbrook et al. |
| 2017/0223575 | A1* | 8/2017 | Duda ........... H04W 28/12 |
| 2017/0264571 | A1 | 9/2017 | Aibester et al. |
| 2017/0289034 | A1 | 10/2017 | Bosshart et al. |
| 2018/0006945 | A1* | 1/2018 | Flajslik ........ H04L 43/08 |
| 2018/0054385 | A1 | 2/2018 | Dharmapurikar et al. |
| 2018/0191640 | A1 | 7/2018 | Calderon et al. |
| 2018/0287819 | A1 | 10/2018 | Mayer-Wolf et al. |
| 2020/0228433 | A1* | 7/2020 | Lee ............. H04L 69/162 |
| 2020/0244576 | A1* | 7/2020 | Wetterwald ...... H04L 47/17 |
| 2020/0280428 | A1* | 9/2020 | Kovacs ......... H04L 27/2692 |
| 2020/0280518 | A1* | 9/2020 | Lee ............. H04L 47/30 |

OTHER PUBLICATIONS

Bosshart, Patrick, et al., "Forwarding Metamorphosis: Fast Programmable Match-Action Processing in Hardware or SDN," SIGCOMM'13, Aug. 12-16, 2013, 12 pages, ACM, Hong Kong, China.

Non-Published commonly owned U.S. Appl. No. 15/835,239, filed Dec. 7, 2017, 69 pages, Barefoot Networks, Inc.

Non-Published commonly owned U.S. Appl. No. 15/835,242, filed Dec. 7, 2017, 69 pages, Barefoot Networks, Inc.

Non-Published commonly owned U.S. Appl. No. 15/835,247, filed Dec. 7, 2017, 68 pages, Barefoot Networks, Inc.

(56) References Cited

OTHER PUBLICATIONS

Non-Published commonly owned U.S. Appl. No. 15/835,249, filed Dec. 7, 2017, 69 pages, Barefoot Networks, Inc.
Non-Published commonly owned U.S. Appl. No. 15/835,250, filed Dec. 7, 2017, 68 pages, Barefoot Networks, Inc.
U.S. Appl. No. 15/835,233, filed Dec. 7, 2017, Patrick Bosshart.
U.S. Appl. No. 15/835,235, filed Dec. 7, 2017, Patrick Bosshart.
U.S. Appl. No. 15/835,238, filed Dec. 7, 2017, Yi Li.
U.S. Appl. No. 15/835,239, filed Dec. 7, 2017, Jay Evan Scott Peterson.
U.S. Appl. No. 15/835,242, filed Dec. 7, 2017, Jay Evan Scott Peterson.
U.S. Appl. No. 15/835,247, filed Dec. 7, 2017, Jay Evan Scott Peterson.
U.S. Appl. No. 15/835,249, filed Dec. 7, 2017, Yi Li.
U.S. Appl. No. 15/835,250, filed Dec. 7, 2017, Yi Li.
Final Office Action for U.S. Appl. No. 15/835,239, dated Jun. 19, 2019, 18 pages.
Final Office Action for U.S. Appl. No. 15/835,247, dated Jul. 10, 19 pages.
First Office Action for U.S. Appl. No. 15/835,242, dated Oct. 18, 2019, 8 pages.
First Office Action for U.S. Appl. No. 15/835,249, dated Dec. 31, 2018, 16 pages.
Non-Published commonly owned U.S. Appl. No. 15/835,233, filed Dec. 7, 2017, 36 pages, Barefoot Networks, Inc.
Non-Published commonly owned U.S. Appl. No. 15/835,235, filed Dec. 7, 2017, 36 pages, Barefoot Networks, Inc.
Notice of Allowance for U.S. Appl. No. 15/835,233, dated Jul. 3, 2019, 8 pages.
Notice of Allowance for U.S. Appl. No. 15/835,233, dated Oct. 29, 2019, 8 pages.
Notice of Allowance for U.S. Appl. No. 15/835,235, dated Aug. 20, 2019, 16 pages.
Notice of Allowance for U.S. Appl. No. 15/835,239, dated Nov. 13, 2019, 10 pages.
Notice of Allowance for U.S. Appl. No. 15/835,242, dated Jul. 1, 2019, 7 pages.
Notice of Allowance U.S. Appl. No. 15/835,249, dated Jul. 25, 2019, 10 pages.
Notice of Allowance U.S. Appl. No. 15/835,250, dated Jul. 25, 2019, 17 pages.
Office Action for U.S. Appl. No. 15/835,233, dated Feb. 8, 2019, 17 pages.
Office Action for U.S. Appl. No. 15/835,239, dated Feb. 7, 2019, 20 pages.
Office Action for U.S. Appl. No. 15/835,247, dated Dec. 31, 2018, 18 pages.
Office Action for U.S. Appl. No. 15/835,250, dated Apr. 4, 2019, 16 pages.
Office Action for U.S. Appl. No. 15/835,235, dated Feb. 25, 2019, 24 pages.

\* cited by examiner

USING STATEFUL TRAFFIC MANAGEMENT DATA TO PERFORM PACKET PROCESSING

BACKGROUND

Packet processing pipelines are generally designed to perform various packet processing operations (e.g., packet forwarding and analysis, etc.). Based on configuration from the control plane, the data plane packet processing pipeline makes decisions about packets that it receives, and can be configured to store data from these packets for future processing. However, other circuitry on a hardware forwarding element might generate data that would improve the packet processing.

BRIEF SUMMARY

Some embodiments of the invention provide a packet processing pipeline of a network forwarding integrated circuit (IC) that receives and processes non-packet data generated by the network forwarding IC (e.g., by other circuitry on the IC). For instance, in some embodiments a traffic management unit, that enqueues packets after processing by an ingress pipeline and prior to processing by an egress pipeline, generates data (e.g., queue state data) and provides this data to the ingress and/or egress pipelines. The pipelines of some embodiments store this data in stateful tables and use the stored data to make processing decisions for subsequent packets, embed the stored data in subsequent packets in order to provide the data to a monitor.

The network forwarding IC, which is incorporated into a hardware forwarding element of some embodiments, includes a set of configurable packet processing pipeline resources that operate as both ingress pipelines (for packets received at the forwarding element) and egress pipelines (for packets being sent from the forwarding element), in addition to the traffic management unit. The traffic management unit is responsible for receiving packets from an ingress pipeline and enqueuing the packet for a port associated with an egress pipeline. Typically, a packet is processed by one ingress pipeline, enqueued by the traffic management unit (which may also perform packet replication, if necessary), and processed by one egress pipeline. Each packet processing pipeline (whether acting as an ingress or egress pipeline) includes a parser, a match-action unit (a series of match-action stages), and a deparser. The parser receives a packet as an ordered stream of data, and based on its instructions and analysis of the packet, identifies packet header fields and stores the packet header fields in a set of data containers (a packet header vector (PHV)) to be sent to the match-action unit. After the last match-action stage, the PHV is provided to the deparser, so that the deparser can reconstruct the packet.

Each match-action stage of a processing pipeline of some embodiments has the ability to run an ingress thread for processing an ingress packet and an egress thread for processing an egress packet. For each clock cycle, each stage runs either both an ingress and egress thread, one or the other, or neither, depending on whether ingress and/or egress packets are provided to the stage for that cycle. In addition, some embodiments provide the ability to run one or more additional threads for processing non-packet data. In some embodiments, this non-packet thread is a third thread that is tied to the ingress thread. That is, a set of PHV data containers allocated to the non-packet data have the same timing as the ingress PHV (if one is present) through the match-action stages, which are configured to execute both the ingress and non-packet threads. As the match-action resources are configurable, an administrator can configure the ingress and egress processing as well as the non-packet processing in some embodiments, such that each of these threads are effectively running different programs (e.g., P4 programs) composed by the administrator, using different resources of the pipeline (e.g., different memory units, PHV containers, etc.). In other embodiments, the non-packet thread is tied to the egress thread, or non-packet threads may be tied to both ingress and egress threads.

In some embodiments, although the non-packet thread is tied to the ingress thread, the non-packet data can be transmitted through the packet processing pipeline either with or without an ingress packet. While the non-packet thread may be tied to the ingress and/or egress threads in different embodiments, for purposes of this discussion the case in which the non-packet thread is tied to the ingress thread will be used.

On each clock cycle, if the parser of the pipeline has received an ingress packet, then the parser parses the ingress packet to add the packet fields to the appropriate PHV data containers. In addition, if non-packet data has been received, the parser also adds this data to the appropriate PHV data container or containers. However, if no new ingress packets have been received, then the parser can send the non-packet data without an ingress packet. That is, although the ingress and non-packet threads are related, they are not dependent on each other. In some cases, the packets are dispatched into the pipeline as quickly as possible (to minimize latency), and if present non-packet data is sent with these packets. However, for periods of time without ingress packets, the non-packet data is sent to the match-action pipeline at a pre-specified (e.g., configured) rate (i.e., not necessarily every clock cycle). With the non-packet data paralleling the packet data (as opposed to being transmitted as a special type of ingress packet), the processing of actual received data packets is not delayed. In some embodiments, when there is an ingress packet without non-packet data or non-packet data without an ingress packet, the pointer for the thread that does not have data is set to the end of the pipeline (thereby saving the use of some of the match-action stage resources, which saves power).

The non-packet data, in some embodiments, is used by the packet processing pipeline to process (e.g., to make decisions for) subsequent packets. To accomplish this, in some embodiments the pipeline stores the non-packet data in stateful tables associated with one or more of the match-action stages, which are accessed by the stateful processing units of the corresponding match-action stages. With the non-packet thread paralleling the ingress thread, this creates a situation in some embodiments in which the non-packet thread needs to write its data to a first memory location in the table in the same stage (and thus same clock cycle) that the ingress thread reads from a (potentially different) second memory location in the table.

Because two memory locations in the table cannot be accessed in the same clock cycle, some embodiments store two copies of these stateful tables (i.e., any tables that store data from non-packet threads). Each piece of non-packet data is then sent into the pipeline twice (e.g., in subsequent clock cycles, offset by multiple clock cycles, etc.), along with an indicator (e.g., a bit) specifying to which of the two copies of the table the data should be stored. The match-action stage writes the first copy of the data to the first table, and subsequently writes the second copy of the data to the second table. If the first copy of the non-packet data is sent to the pipeline along with an ingress packet, then that same match-action stage reads from the second copy of the table for that packet, if necessary. Similarly, if the second copy of the non-packet data is sent to the pipeline along with an ingress packet, then that match-action stage reads from the first copy of the table for that packet, if necessary. The indicator sent with the non-packet data is used by the match-action stage to not only determine to which of the two copies of the table to write the non-packet data, but from which of the copies of the table to read data for packet processing.

As mentioned, each match-action stage includes a stateful processing unit that accesses and uses the stateful tables. These stateful processing units operate in the data plane at the line rate of the network forwarding IC. In some embodiments, at least a subset of the stateful processing units can be configured to receive a set of entries stored in a memory location of a stateful table and identify either a maximum or minimum value from the set of entries. For example, each memory location might be a 128-bit RAM word, storing eight 16-bit or sixteen 8-bit values. A previous match-action stage (based on, e.g., analysis of various packet header fields) specifies a particular memory location, then the data plane stateful processing unit retrieves the RAM word at the specified location and, according to its configuration, outputs the maximum or minimum value of the multiple values stored in the RAM word. This identified maximum or minimum value and/or its location within the RAM word can be stored in a data container and sent to the next match-action stage for further processing if needed.

In some embodiments, a group of related stateful table entries may be too large for all of the values to fit within a single RAM word. In this case, some embodiments divide the values over two or more such RAM words, and a prior match-action stage selects among the RAM words. Some embodiments use a randomization algorithm to select one of the RAM words (e.g., a hash or random number modulo the number of RAM words in the group). In addition, some of the values may become invalid (if, e.g., the values represent queues or ports that are not currently operational). In some embodiments, one of the match-action stages stores bitmaps for each RAM word that keep track of which values in the RAM word are valid at any particular point in time. When inputting the set of values into the minimum or maximum value identification circuitry, some embodiments use this bitmask so that the minimum or maximum value is only selected from among the valid values of the RAM word.

In various embodiments, the non-packet data stored in the stateful tables and used by the ingress (and/or egress) pipeline may be generated by different components of the network forwarding IC. That is, various components could generate data (even data resembling a packet) that is processed by a non-packet thread separate from the ingress and egress threads.

In some embodiments, the non-packet data stored in the stateful tables and used by the ingress pipeline is data generated by the traffic management unit. The traffic management unit of some embodiments includes numerous queues for each egress pipeline, which store packets after ingress processing until the packet is released to its egress pipeline. Each of the queues corresponds to a particular port of the hardware forwarding element (with multiple queues per port), each of which in turn corresponds to one of the packet processing pipelines. These queues may fill up if the ingress pipelines are sending packets to certain queues of the traffic management unit faster than the egress pipelines can process the packets. For example, even if all of the pipeline stages are processing one packet per clock cycle, if multiple ingress pipelines are regularly sending packets to queues for the same egress pipelines, these queues may fill up.

In some embodiments, the traffic management unit generates queue state data and sends this queue state data to one or more of the packet processing pipelines. This data includes the queue depth (i.e., the queue occupancy, or amount of data stored in the queue) and a queue identifier in some embodiments, though in other embodiments the traffic management unit may generate and transmit other types of queue state information for the packet processing pipelines. However, the traffic management unit may include a large number (e.g., several thousand) queues, and so it is not necessarily efficient to send queue state updates every time a packet is added to or released from a queue. Instead, some embodiments set specific thresholds for the queues (either collectively or individually) and send queue state updates to the packet processing pipelines only when one of the queues passes one of its thresholds. Some embodiments send such an update when a queue receives a packet and thus increases past a threshold or releases a packet and thus decreases below a threshold.

The traffic management unit sends the queue state data to the ingress pipelines via a bus in some embodiments. Specifically, the network forwarding IC of some embodiments includes a bus that connects the traffic management unit to the parser of each of the ingress pipelines. The traffic management unit uses this bus to broadcast to each of the ingress pipelines each piece of queue state data that it generates. However, in some cases, as indicated above, the different ingress pipelines will dispatch the received queue state data at different rates. When a first ingress pipeline receives packets at a faster rate than a second ingress pipeline, the first pipeline may send out the queue state data more quickly. The parsers store the queue state data in a size-limited first-in-first-out (FIFO) queue, and in some embodiments, send an acknowledgment back to the traffic management unit each time a piece of the queue state data is pushed into the pipeline. This allows the traffic management unit to keep track of whether any of the pipelines' FIFO queues are filled, and hold off on broadcasting the queue state data until all of the pipelines are capable of receiving the data.

As described above, after a packet processing pipeline receives the queue state data, the pipeline adds the packet to a PHV data container for a non-packet thread that parallels the ingress thread in some embodiments. The non-packet thread stores the data to stateful tables that are used by subsequent packet processing threads (e.g., subsequent ingress threads) to process packets. In order to store the queue state data to a stateful table, in some embodiments a first match-action stage (though not necessarily the first stage in the pipeline) identifies the memory location (e.g., the RAM word and the location within the RAM word) to which to store the queue state data based on the queue identifier in the PHV data container with the queue state. For instance, this first stage might use a table that maps queue state identifiers to memory locations, as specific non-consecutive queues may need to be grouped together within a RAM word (e.g., if the queues are part of a link aggregation group (LAG)). A subsequent stage of the pipeline performs the write operation to write the queue state to the specified memory location. In addition, the queue state may be larger than the allocated memory space (e.g., 16 bits, 8 bits, etc.), in which case a match-action stage prior to the write operation scales this value to the appropriate size. In different embodiments, this can involve a range mapping operation or simply removing the lowest order bits.

The ingress pipelines use the queue state data (e.g., queue depth) stored in the stateful tables for various operations in different embodiments. Some embodiments use the queue state data for queries regarding flow statistics, such as how often a particular queue (to which a specific flow is assigned) was filled past a threshold queue depth, or the percentage of queues (or a subset of queues) that are past a threshold queue depth at any given time. In some embodiments, the queue state data is not necessarily stored in stateful tables, and may be used directly by the ingress (or egress) packet thread processed synchronously with the non-packet queue state data.

Some embodiments retrieve the stored queue state data when processing subsequent packets and store this state data in one of the packet thread PHV data containers, so that the deparser stores the queue state data in a particular header field of the packet (e.g., an encapsulation header field repurposed to carry various types of state data). Using this mechanism, the packet carries the queue state data to its destination (or, using packet replication in the traffic management unit, a different destination). The destination can then extract the queue state data from the packet and use the queue state data for monitoring, event detection, or even to initiate changes to the network forwarding IC configuration or a data source.

As another example, the ingress pipelines assign packets to traffic management unit queues based on the destination for the packet, and use the queue state data stored in the stateful tables to make these assignments. For instance, as mentioned, some embodiments store the queue state for the multiple queues of a LAG within one RAM word (or a set of RAM words, if there are too many queues to fit in one RAM word). Once the ingress pipeline identifies the RAM word from which to select a queue, the stateful processing unit of some embodiments identifies the minimum queue depth within the RAM word, and outputs this location. A mapping table in a subsequent stage maps the location to a particular queue (similar to the mapping table used by the non-packet thread to map queue state data to a particular memory location).

As mentioned above, a group of related stateful table entries may be too large for all of the values to fit within a single RAM word. In the case of a LAG or other group of related queues, this group may be too large for all of the corresponding queue states to fit within a single RAM word. In this case, some embodiments divide the queue state data over two or more such RAM words, and a match-action stage (after the identification of the group of queues for a packet but before the queue selection operation) selects among the RAM words. Some embodiments use a randomization algorithm to select one of the RAM words (e.g., a hash or random number modulo the number of RAM words in the group). In addition, as mentioned, a bitmask may be used to identify the valid (i.e., currently operational) queues at a particular point in time.

As opposed to performing a specific minimum queue depth identification operation, some embodiments use the stateful queue depth data to override a queue selection decision. For example, if the ingress pipeline selects a queue for a packet (using, e.g., a hash-based selection mechanism to choose among multiple related queues), the ingress pipeline can verify that the queue is not congested past a specific queue depth. If the queue is overly congested, the ingress pipeline then re-assigns the packet to a different one of the related queues.

The queue state data may also be used by the ingress pipeline to intelligently drop packets in some embodiments. The traffic management unit may drop a packet if the packet is assigned to a queue that is too full to hold the packet (in the case, e.g., that other queues are not available to direct the packet toward its destination), but does not have a mechanism to alert either the sender or recipient of the dropped packet. However, in some embodiments the ingress pipeline can identify when a packet will be dropped because the queue to which the packet is assigned is too full. The ingress pipeline can then generate a summary signaling packet for the sender, destination, or both. This summary signaling packet of some embodiments notifies the recipient that the packet was dropped, without taking up the space of the packet. Some embodiments concatenate multiple packets from the same data flow into one packet, by including certain header fields indicative of the flow once in the concatenated packet. For instance, some embodiments generate and send a summary packet with the source and destination IP addresses and transport layer port numbers, and then also include sequence numbers for each of the dropped packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a packet processing pipeline of a network forwarding integrated circuit (IC) that receives and processes non-packet data generated by the network forwarding IC (e.g., by other circuitry on the IC). For instance, in some embodiments a traffic management unit, that enqueues packets after processing by an ingress pipeline and prior to processing by an egress pipeline, generates data (e.g., queue state data, buffer usage data) and provides this data to the ingress and/or egress pipelines. The pipelines of some embodiments store this data in stateful tables and use the stored data to make processing decisions for subsequent packets.

Figure 1:
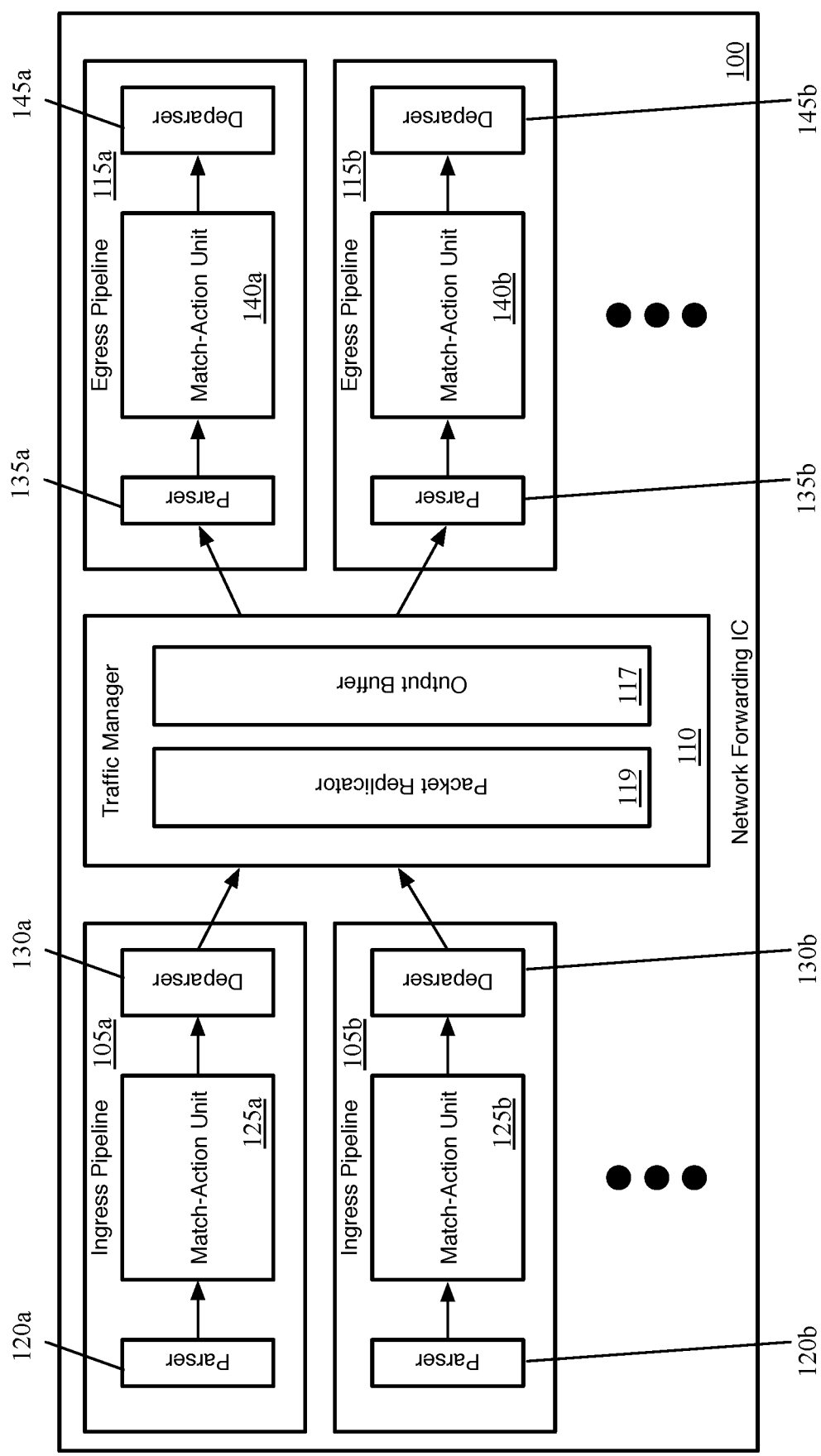
FIG. 1 conceptually illustrates the structure of a network forwarding IC of some embodiments.

FIG. 1 conceptually illustrates the structure of such a network forwarding IC 100 of some embodiments (that is, e.g., incorporated into a hardware forwarding element). Specifically, FIG. 1 illustrates several ingress pipelines 105, a traffic management unit (referred to as a traffic manager) 110, and several egress pipelines 115. Though shown as separate structures, in some embodiments the ingress pipelines 105 and the egress pipelines 115 actually use the same circuitry resources. In some embodiments, the pipeline circuitry is configured to handle both ingress and egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

Generally, when the network forwarding IC 100 receives a packet, in some embodiments the packet is directed to one of the ingress pipelines 105 (each of which may correspond to one or more ports of the hardware forwarding element). After passing through the selected ingress pipeline 105, the packet is sent to the traffic manager 110, where the packet is enqueued and placed in the output buffer 117. In some embodiments, the ingress pipeline 105 that processes the packet specifies into which queue the packet should be placed by the traffic manager 110 (e.g., based on the destination of the packet). The traffic manager 110 then dispatches the packet to the appropriate egress pipeline 115 (each of which may correspond to one or more ports of the forwarding element). In some embodiments, there is no necessary correlation between which of the ingress pipelines 105 processes a packet and to which of the egress pipelines 115 the traffic manager 110 dispatches the packet. That is, a packet might be initially processed by ingress pipeline 105b after receipt through a first port, and then subsequently by egress pipeline 115a to be sent out a second port, etc.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields. The parser starts from the beginning of the packet and assigns these header fields to fields (e.g., data containers) of a packet header vector (PHV) for processing. In some embodiments, the parser 120 or 135 separates out the packet headers (up to a designated point) from the payload of the packet, and sends the payload (or the entire packet, including the headers and payload) directly to the deparser without passing through the MAU processing (e.g., on a single wire).

The MAU 125 or 140 performs processing on the packet data (i.e., the PHV). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU. The MAU stages are described in more detail below by reference to FIG. 2.

The deparser 130 or 145 reconstructs the packet using the PHV as modified by the MAU 125 or 140 and the payload received directly from the parser 120 or 135. The deparser constructs a packet that can be sent out over the physical network, or to the traffic manager 110. In some embodiments, the deparser constructs this packet based on data received along with the PHV that specifies the protocols to include in the packet header, as well as its own stored list of data container locations for each possible protocol's header fields.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, queue state analysis components, as well as additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a queuing policy that is control-plane configurable. When a packet data reference reaches the head of its queue and is scheduled for dequeuing, the corresponding packet data is read out of the output buffer 117 and into the corresponding egress pipeline 115. In some embodiments, packet data may be referenced by multiple pipelines (e.g., for a multicast packet). In this case, the packet data is not removed from this output buffer 117 until all references to the packet data have cleared their respective queues.

Figure 2:
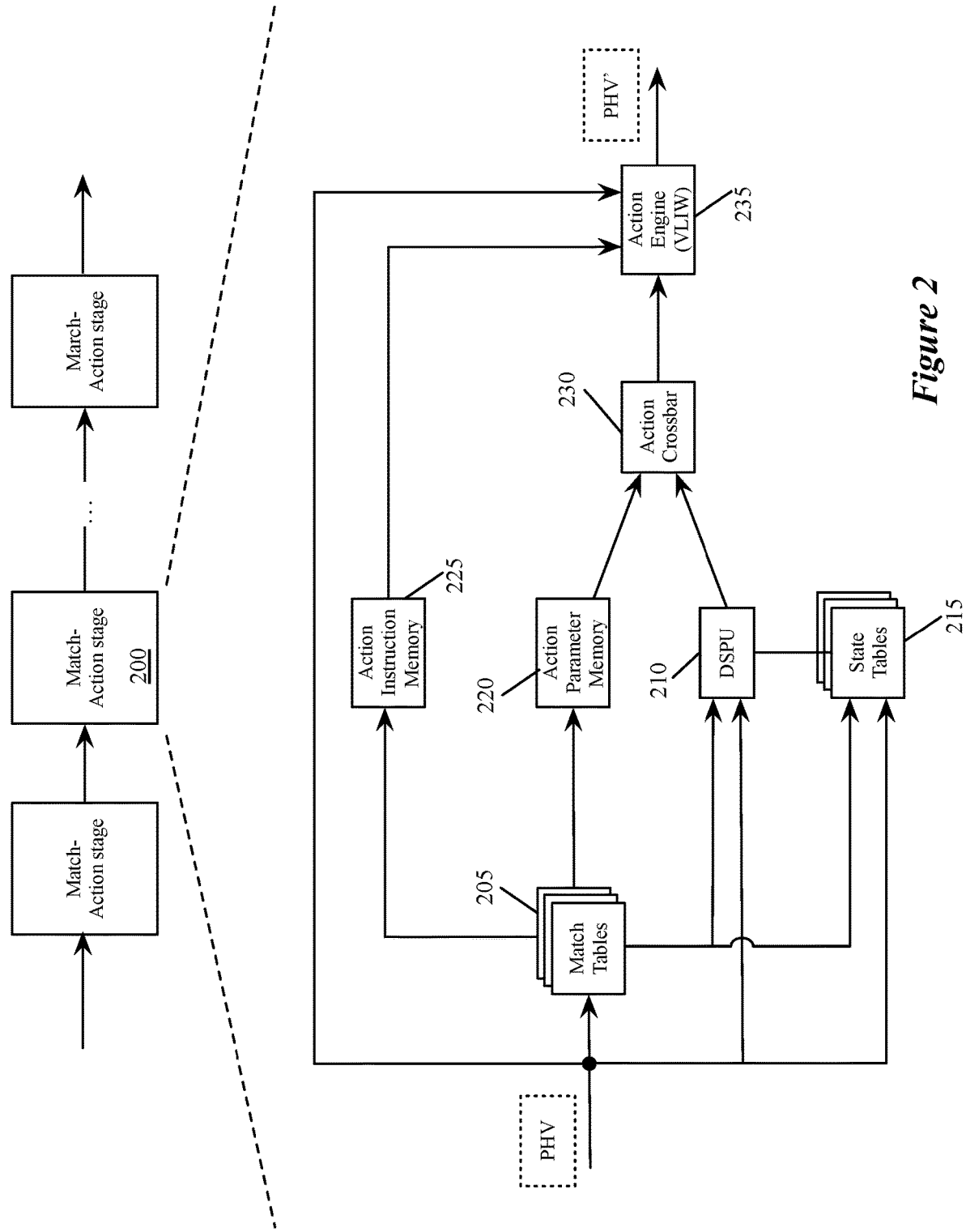
FIG. 2 illustrates an example of a match-action unit of some embodiments.

FIG. 2 illustrates an example of a match-action unit of some embodiments. As mentioned above, a packet processing pipeline of some embodiments has several MAU stages, each of which includes packet-processing circuitry for forwarding received data packets and/or performing stateful operations based on these data packets. These operations are performed by processing values stored in the PHVs (i.e., the primary PHVs) of the packets.

As shown in FIG. 2, the MAU stage 200 in some embodiments has a set of one or more match tables 205, a data plane stateful processing unit 210 (DSPU), a set of one or more stateful tables 215, an action crossbar 230, an action parameter memory 220, an action instruction memory 225, and an action engine 235. The match table set 205 can compare one or more fields in a received PHV to identify one or more matching flow entries (i.e., entries that match the PHV). The match table set can be TCAM tables or exact match tables in some embodiments. In some embodiments, the match table set can be accessed at an address that is a value extracted from one or more fields of the PHV, or it can be a hash of this extracted value.

In some embodiments, the value stored in a match table record that matches a packet's flow identifier, or that is accessed at a hash-generated address, provides addresses for the action parameter memory 220 and action instruction memory 225. Also, such a value from the match table can provide an address and/or parameter for one or more records in the stateful table set 215, and can provide an instruction and/or parameter for the DSPU 210. As shown, the DSPU 210 and the stateful table set 215 also receive a processed PHV. The PHVs can include instructions and/or parameters for the DSPU, while containing addresses and/or parameters for the stateful table set 215.

The DSPU 210 in some embodiments performs one or more stateful operations, while a stateful table 215 stores state data used and generated by the DSPU 210. Though shown as a single DSPU 210, in some embodiments this may represent multiple DSPUs within a match-action stage. For example, some embodiments include two DSPUs and two stateful tables. In some embodiments, the DSPU includes one or more programmable arithmetic logic unit (ALUs) that perform operations synchronously with the dataflow of the packet-processing pipeline (i.e., synchronously at the line rate). As such, the DSPU can process a different PHV on every clock cycle, thus ensuring that the DSPU would be able to operate synchronously with the dataflow of the packet-processing pipeline. In some embodiments, a DSPU performs every computation with fixed latency (e.g., fixed number of clock cycles). In some embodiments, the local or remote control plane provides configuration data to program a DSPU.

The DSPU 210 outputs a set of action parameters to the action crossbar 230. The action parameter memory 220 also outputs a set of action parameters to this crossbar 230. The action parameter memory 220 retrieves the action parameter that it outputs from its record that is identified by the address provided by the match table set 205. The action crossbar 230 in some embodiments maps the action parameters received from the DSPU 210 and action parameter memory 220 to an action parameter bus 240 of the action engine 235. This bus provides the set of action parameters to this engine 235. For different data packets, the action crossbar 230 can map the action parameters from DSPU 210 and memory 220 differently to this bus 240. The crossbar can supply the action parameters from either of these sources in their entirety to this bus 240, or it can concurrently select different portions of these parameters for this bus.

The action engine 235 also receives a set of instructions to execute from the action instruction memory 225. This memory 225 retrieves the instruction set from its record that is identified by the address provided by the match table set 205. The action engine 235 also receives the PHV for each packet that the MAU processes. Such a PHV can also contain a portion or the entirety of a set of instructions to process and/or a set of parameters for processing the instruction.

The action engine 235 in some embodiments includes a parameter multiplexer and a very large instruction word (VLIW) processor, which is a set of one or more ALUs. In some embodiments, the parameter multiplexer receives the parameter sets from the action crossbar 230 and input PHV and outputs the parameters as operands to the VLIW processor according to the instruction set (from the instruction memory 335 or the PHV. The VLIW processor executes instructions (from the instruction memory 235 or the PHV) applied to the operands received from the parameter multiplexer. The action engine 235 stores the output of its operation in the PHV in order to effectuate a packet forwarding operation and/or stateful operation of its MAU stage 200. The output of the action engine 235 forms a modified PHV (PHV') for the next MAU stage.

In other embodiments, the match tables 205 and the action tables 215, 220 and 225 of the MAU stage 200 can be accessed through other methods as well. For instance, in some embodiments, each action table 215, 220 or 225 can be addressed through a direct addressing scheme, an indirect addressing scheme, and an independent addressing scheme. The addressing scheme that is used depends on the configuration of the MAU stage, which in some embodiments, is fixed for all data packets being processed, while in other embodiments can be different for different packets being processed.

In the direct addressing scheme, the action table uses the same address that is used to address the matching flow entry in the match table set 205. As in the case of a match table 205, this address can be a hash generated address value or a value from the PHV. Specifically, the direct address for an action table can be a hash address that a hash generator (not shown) of the MAU generates by hashing a value from one or more fields of the PHV. Alternatively, this direct address can be a value extracted from one or more fields of the PHV.

On the other hand, the indirect addressing scheme accesses an action table by using an address value that is extracted from one or more records that are identified in the match table set 205 for a PHV. As mentioned above, the match table records are identified through direct addressing or record matching operations in some embodiments.

The independent address scheme is similar to the direct addressing scheme except that it does not use the same address that is used to access the match table set 205. Like the direct addressing scheme, the table address in the independent addressing scheme can either be the value extracted from one or more fields of the PHV, or it can be a hash of this extracted value. In some embodiments, not all of the action tables 215, 220 and 225 can be accessed through these three addressing schemes. For example, in some embodiments, some of the memories are accessible only through the direct and indirect addressing schemes.

In some embodiments, each match-action stage 200 of a processing pipeline of some embodiments has the ability to run an ingress thread for processing an ingress packet and an egress thread for processing an egress packet. For each clock cycle, each MAU stage runs either both an ingress and egress thread, one or the other, or neither, depending on whether ingress and/or egress packets are provided to the stage (e.g., in the PHV) for that cycle. In addition, some embodiments provide the ability to run one or more additional threads for processing non-packet data. In some embodiments, this non-packet thread is a third thread that is tied to the ingress thread. That is, a set of PHV data containers allocated to the non-packet data have the same timing as the ingress PHV (if one is present) through the match-action stages, which are configured to execute both the ingress and non-packet threads. As the match-action resources are configurable, an administrator can configure the ingress and egress processing as well as the non-packet processing in some embodiments, such that each of these threads are effectively running different programs composed by the administrator, using different resources of the pipeline (e.g., different memory units, PHV containers, etc.). In other embodiments, the non-packet thread is tied to the egress thread, or non-packet threads may be tied to both ingress and egress threads.

Figure 3:
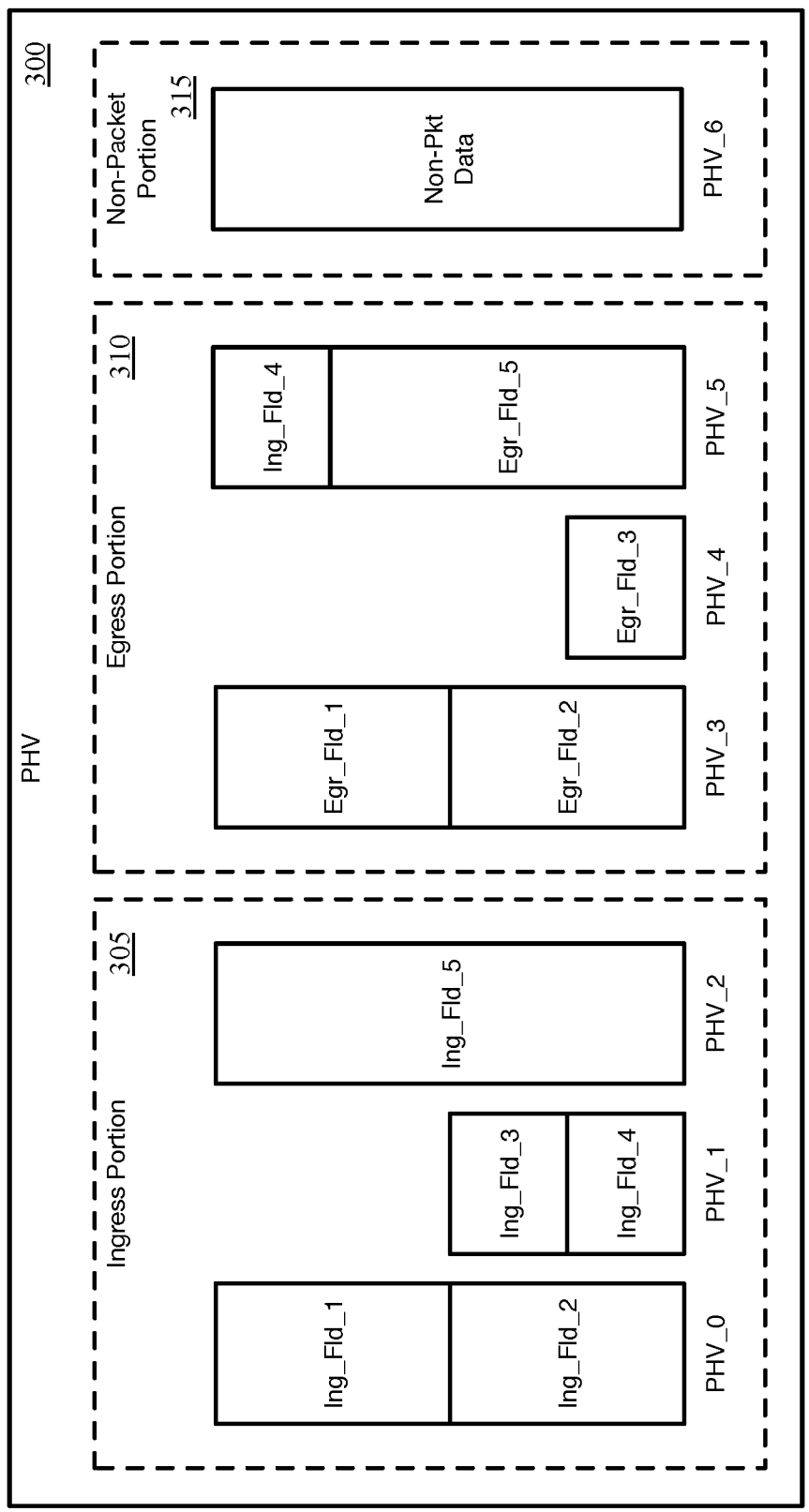
FIG. 3 conceptually illustrates an example PHV that would be output by a parser of some embodiments.

FIG. 3 conceptually illustrates an example PHV 300 that would be output by a parser of some embodiments. This PHV 300, as shown, includes an ingress portion 305, an egress portion 310, and a non-packet portion 315. In this example, the ingress portion 305 and egress portion 310 have only three data containers each, and it should be understood that a typical PHV will have significantly more data allocated for storing packet header fields and associated data. In some embodiments, an administrator allocates the PHV resources between the ingress packet thread, egress packet thread, and non-packet portion. In other embodiments, the ingress portion and egress portion are fixed for a particular network forwarding IC, with the non-packet data allocated within the ingress portion by the administrator.

On each clock cycle, the parser can output a PHV 300, with any combination of the three portions 305-315 having data to be processed by the MAU. Portions that do not store any data are zeroed out in some embodiments, or otherwise indicated to not be carrying data. If either the egress portion 310 or the combination of the ingress and non-packet portions 305 and 315 are not storing data for a particular clock cycle, some embodiments save power by pointing the thread for that portion to the end of the pipeline.

In some embodiments, although the non-packet thread is tied to the ingress thread (i.e., the non-packet thread has the same timing through the match-action stages of the pipeline as the ingress thread), the non-packet data can be transmitted through the packet processing pipeline either with or without an ingress packet. While the non-packet thread may be tied to the ingress and/or egress threads in different embodiments, much of this specification and figures discusses the case in which the non-packet thread is tied to the ingress thread. However, it should be understood that in other embodiments, non-packet threads could be tied to the egress thread or both ingress and egress threads.

On each clock cycle, if the parser of the pipeline has received an ingress packet, then the parser parses the ingress packet to add the packet fields to the appropriate PHV data containers. In addition, if non-packet data has been received, the parser also adds this data to the appropriate PHV data container.

Figure 4:
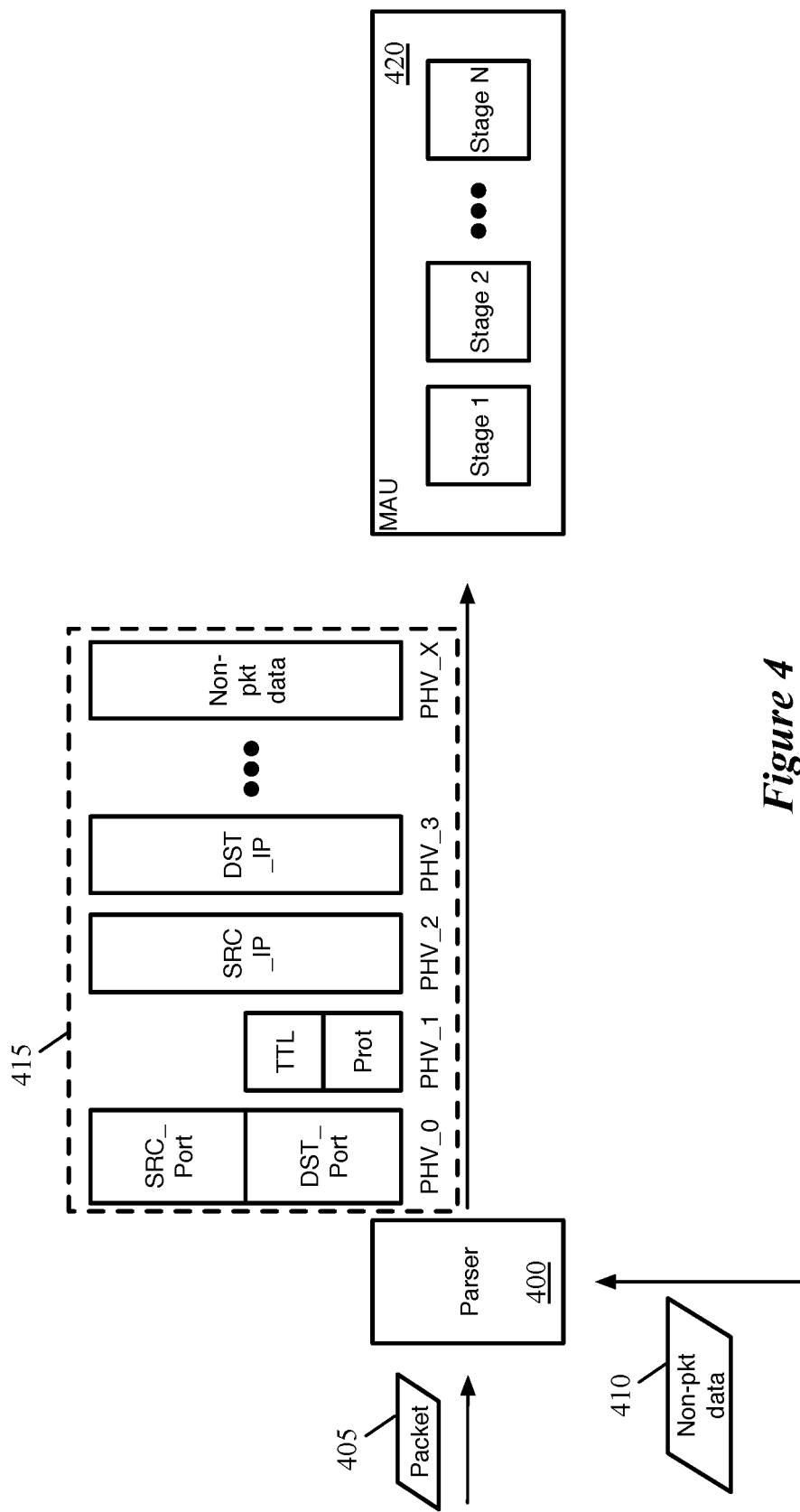
FIG. 4 conceptually illustrates a parser that outputs a PHV including both ingress packet data and non-packet data.

FIG. 4 conceptually illustrates a parser 400 that outputs a PHV 415 including both ingress packet data and non-packet data. As shown, for the current clock cycle, the parser receives (or has stored in its queues of incoming data) a packet 405 and non-packet data 410. The packet 405 is a formatted stream of bits, and the parser executes a parse graph state machine to identify each layer of header fields and store the various fields into the appropriate data containers of the PHV 415. For instance, in the example shown, the parser 400 stores the source and destination transport ports in the PHV_0 data container, the time to live and protocol fields in the PHV_1 data container, etc. The non-packet data, in some embodiments, is generated internally on the network forwarding IC (e.g., by the traffic manager) and delivered to the parser 400. Thus, the parser 400 stores the non-packet data in a specific data container of the PHV (PHV_X), which is designated for the non-packet data. Depending on the type and size of the pieces of non-packet data that are sent to the network forwarding IC, different sizes and numbers of data containers may be allocated to non-packet data in different embodiments. As shown, the parser 400 sends the PHV (in this case including ingress packet data and non-packet data) to the first stage of the MAU 420.

Figure 5:
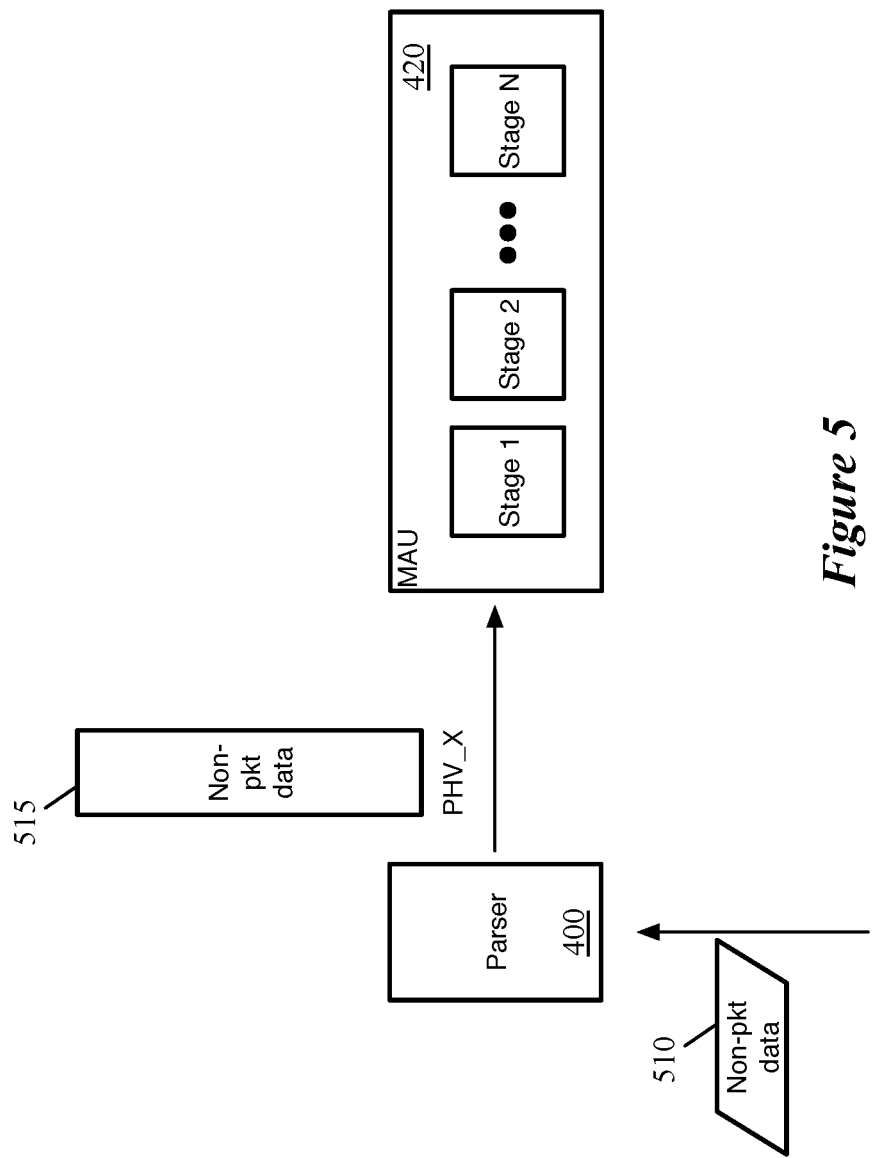
FIG. 5 conceptually illustrates the parser of FIG. 4 outputting a PHV including only non-packet data.

However, if no new ingress packets have been received, in some embodiments the parser can send the non-packet data without an ingress packet. That is, although the ingress and non-packet threads are related, they are not dependent on each other. FIG. 5 conceptually illustrates the parser 400 outputting a PHV 515 including only non-packet data. As shown in the figure, for the current clock cycle, the parser 400 receives (or has stored in its queues of incoming data) only non-packet data 510. The parser 400 stores the non-packet data in its designated data container PHV_X of the PHV 515, and sends the PHV including only non-packet data to the MAU 420. In some embodiments, the PHV for each clock cycle indicating which portions of the PHV (e.g., ingress, egress, and non-packet data) are valid, so that the match-action stages will only run the threads for those types of data.

Different embodiments dispatch the non-packet data to the match-action unit at different rate. In some cases, packets are dispatched into the pipeline as quickly as possible (to minimize latency), and if present non-packet data is sent with these packets. However, for periods of time without ingress packets, the non-packet data is sent to the match-action pipeline at a pre-specified (e.g., configured) rate (i.e., not necessarily every clock cycle, even when non-packet data is received by the parser at such a rate).

Figure 6:
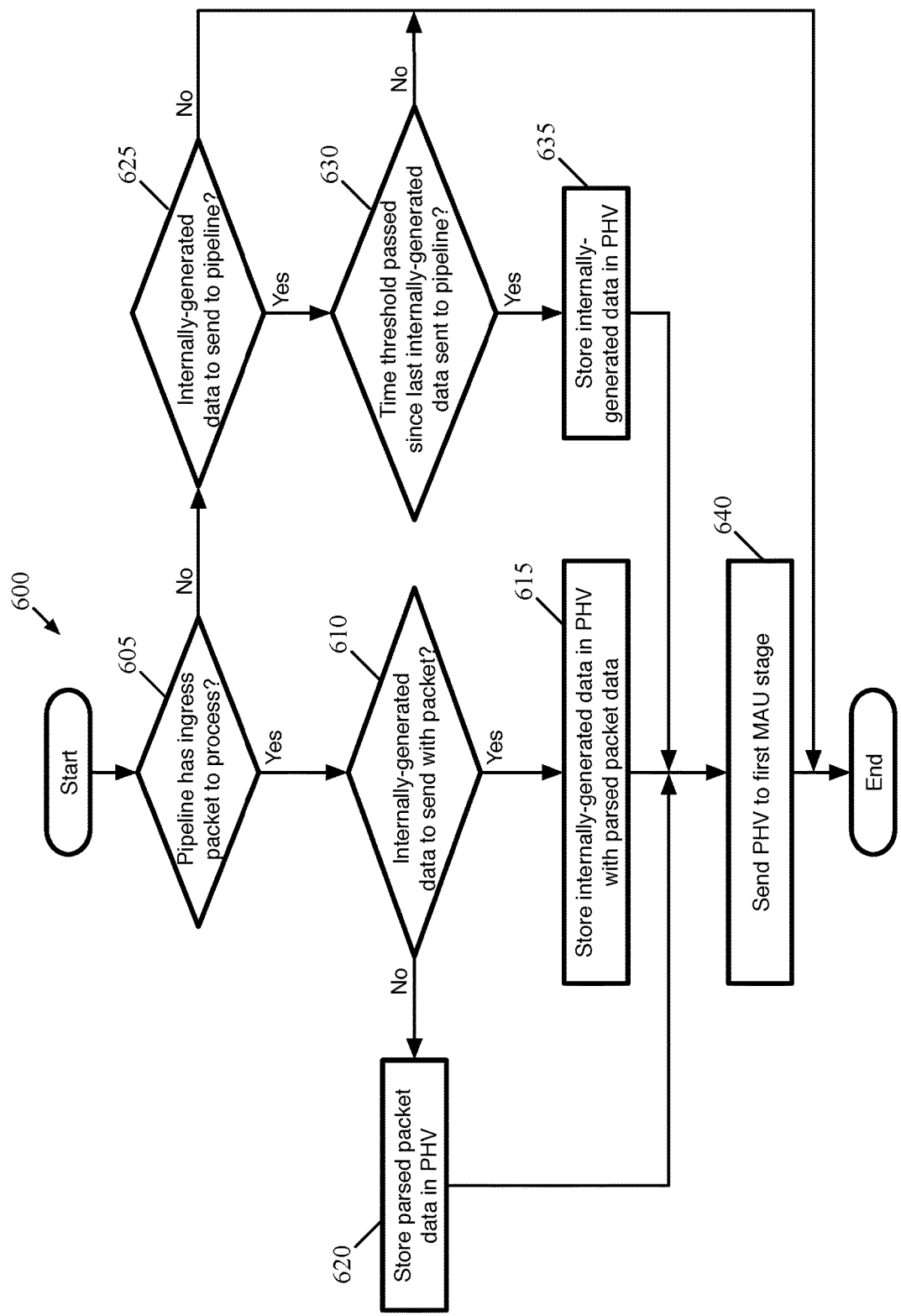
FIG. 6 conceptually illustrates a process of some embodiments for determining whether to include ingress packet data and/or non-packet data in the PHV for a particular clock cycle.

FIG. 6 conceptually illustrates a process 600 of some embodiments for determining whether to include ingress packet data and/or non-packet data in the PHV for a particular clock cycle. In some embodiments, each packet processing pipeline parser in the network forwarding IC performs the process 600 or a similar process each clock cycle. However, it should be understood that this is a conceptual process, and that the parser may not go through all of the various decision-making operations shown in the process 600. Instead, the process 600 represents the output of the parser of some embodiments based on the different possible inputs it receives.

As shown, the process begins by determining (at 605) whether the pipeline has an ingress packet to process. The process 600 relates only to the ingress packet processing and does not involve the egress packet processing. Some embodiments, to minimize latency, always process the next received packet if one is available. If the pipeline has an ingress packet to process, the process 600 determines (at 610) whether any internally-generated non-packet data is available to send to the match-action unit with the packet. In some embodiments, if the MAU resources will be used for processing an ingress packet, the parser will always include the next set of non-packet data (if any is available) along with the ingress packet. With the non-packet data paralleling the packet data (as opposed to being transmitted as a special type of ingress packet), the processing of actual received data packets is not delayed.

Thus, if both an ingress packet and non-packet data are both available, the process 600 stores (at 615) both the internally-generated non-packet data and parsed packet data in the PHV that is output for the current clock cycle. On the other hand, if non-packet data is not available, the process 600 stores (at 620) the parsed ingress packet data in the PHV (without any non-packet data).

When no ingress packet is received by the pipeline for the current clock cycle, the process 600 determines (at 625) whether any internally-generated non-packet data is available to send to the match-action unit. However, even if such data is present, some embodiments rate limit the transmission of the non-packet data into the pipeline. Thus, the process determines (at 630) whether a time threshold (e.g., a particular number of clock cycles) has passed since the last internally-generated non-packet data was sent to the pipeline. If either no such data is present (i.e., no ingress packet and no non-packet data) or the pre-configured time between pieces of non-packet data being sent to the pipeline without an ingress packet has not yet been reached, the process 600 ends (for the current clock cycle). However, if non-packet data is available and the threshold time between pieces of non-packet data has been reached, the process stores (at 635) only the internally-generated data non-packet data in the PHV. Irrespective of whether the PHV includes non-packet data, ingress packet data, or both, the process sends (640) the PHV to the first MAU stage of the pipeline.

In addition, in some embodiments, when there is an ingress packet without non-packet data or non-packet data without an ingress packet, the pointer for the thread that does not have data is set to the end of the pipeline (thereby saving the use of some of the match-action stage resources, which saves power).

Figure 7:
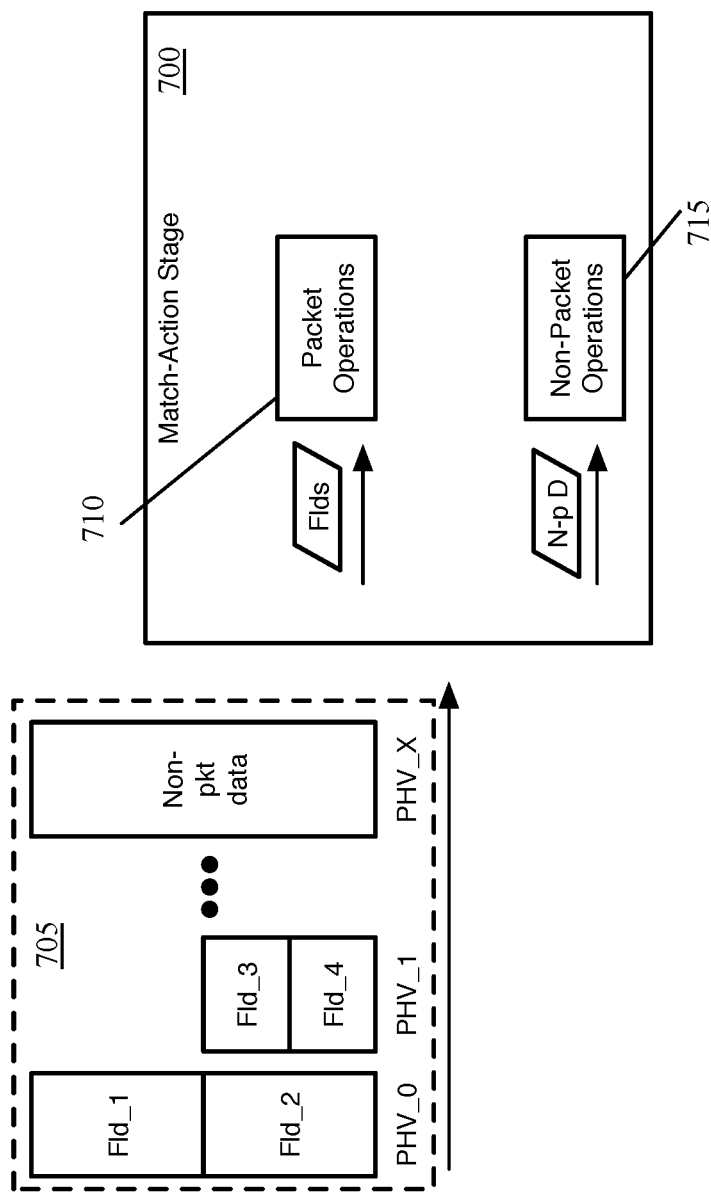
FIG. 7 conceptually illustrates a match-action stage receiving a PHV with both ingress packet and non-packet data, and synchronously performing operations with the packet and non-packet data.

Because a match-action stage performs its processing on a single PHV in one clock cycle in some embodiments, the match-action stage performs packet processing operations in the same clock cycle as it performs operations on the non-packet data in the same PHV. As described in more detail below, this may involve using state data from previous pieces of non-packet data to perform operations on the current packet data. FIG. 7 conceptually illustrates a match-action stage 700 receiving a PHV 705 with both ingress packet and non-packet data, and synchronously performing operations with the packet and non-packet data. Specifically, the PHV 705 includes multiple data containers storing data packet fields as well as a container storing non-packet data. As shown in this figure, the match-action stage performs packet operations 710 (which conceptually represent the operation of various components, as described in more detail above by reference to FIG. 2). Synchronously with these actions, the match-action stage also performs non-packet operations 715 (also conceptually representing the operations of various components, which may overlap with those performing the packet operations).

As mentioned, the non-packet data, in some embodiments, is used by the packet processing pipeline to process (e.g., to make decisions for) subsequent packets. To accomplish this, in some embodiments the pipeline stores the non-packet data in stateful tables associated with one or more of the match-action stages, which are accessed by the stateful processing units of the corresponding match-action stages. With the non-packet thread paralleling the ingress thread, this creates a situation in some embodiments in which the non-packet thread needs to write its data to a first memory location in the table in the same stage (and thus same clock cycle) that the ingress thread reads from a (potentially different) second memory location in the table. However, in some embodiments, two memory locations in the table cannot be accessed in the same clock cycle.

Figure 8:
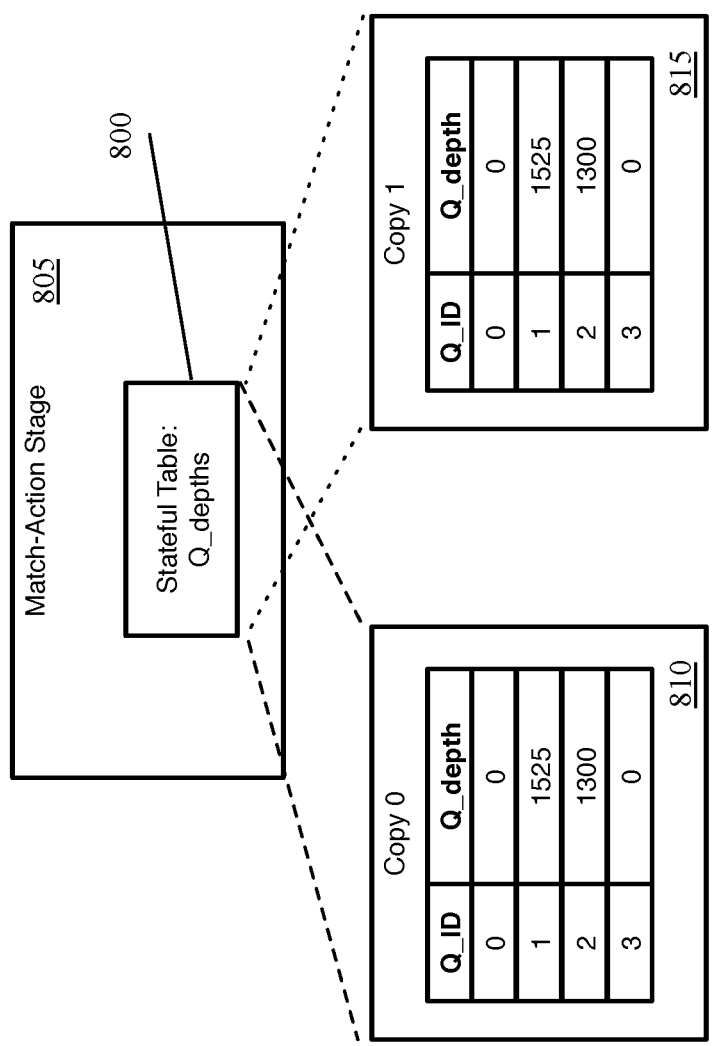
FIG. 8 conceptually illustrates an example of a stateful table of a match-action stage.

To solve this issue, some embodiments store two copies of these stateful tables (i.e., any tables that store data from non-packet threads), and read from one copy of the table while writing to the other copy in the same clock cycle. FIG. 8 conceptually illustrates an example of such a stateful table 800 of a match-action stage 805. In this example, the stateful table 800 stores queue depths (e.g., the queue occupancy, or amounts of data stored in various traffic manager queues). Queue depths are used as examples in many instances throughout this specification, but it should be understood that other types of traffic manager data as well as other non-packet data generated on the network forwarding IC may be stored in these stateful tables as well. As shown in the figure, the stateful table 800 actually contains two copies 810 and 815 of the queue depths table. Both of these copies store the same data, a list of queues and their current queue depths (the data being current to the last update from the traffic manager). Some embodiments may store the data differently, for example simply storing the queue depths arranged in memory locations that are mapped to queue identifiers elsewhere (e.g., in the match tables of the match-action stage 805 or other match-action stages in the pipeline).

To populate the two copies of the table, some embodiments send each piece of non-packet data into the pipeline twice (e.g., in subsequent clock cycles, offset by multiple clock cycles, etc.), along with an alternating indicator (e.g., a bit) specifying to which of the two copies of the table each copy of the data should be stored. The match-action stage writes the first copy of the data to the first table, and subsequently writes the second copy of the data to the second table. If the first copy of the non-packet data is sent to the pipeline along with an ingress packet, then that same match-action stage reads from the second copy of the table for that packet, if necessary. Similarly, if the second copy of the non-packet data is sent to the pipeline along with an ingress packet, then that match-action stage reads from the first copy of the table for that packet, if necessary. The indicator sent with the non-packet data is used by the match-action stage to not only determine to which of the two copies of the table to write the non-packet data, but from which of the copies of the table to read data for packet processing.

Figure 9:
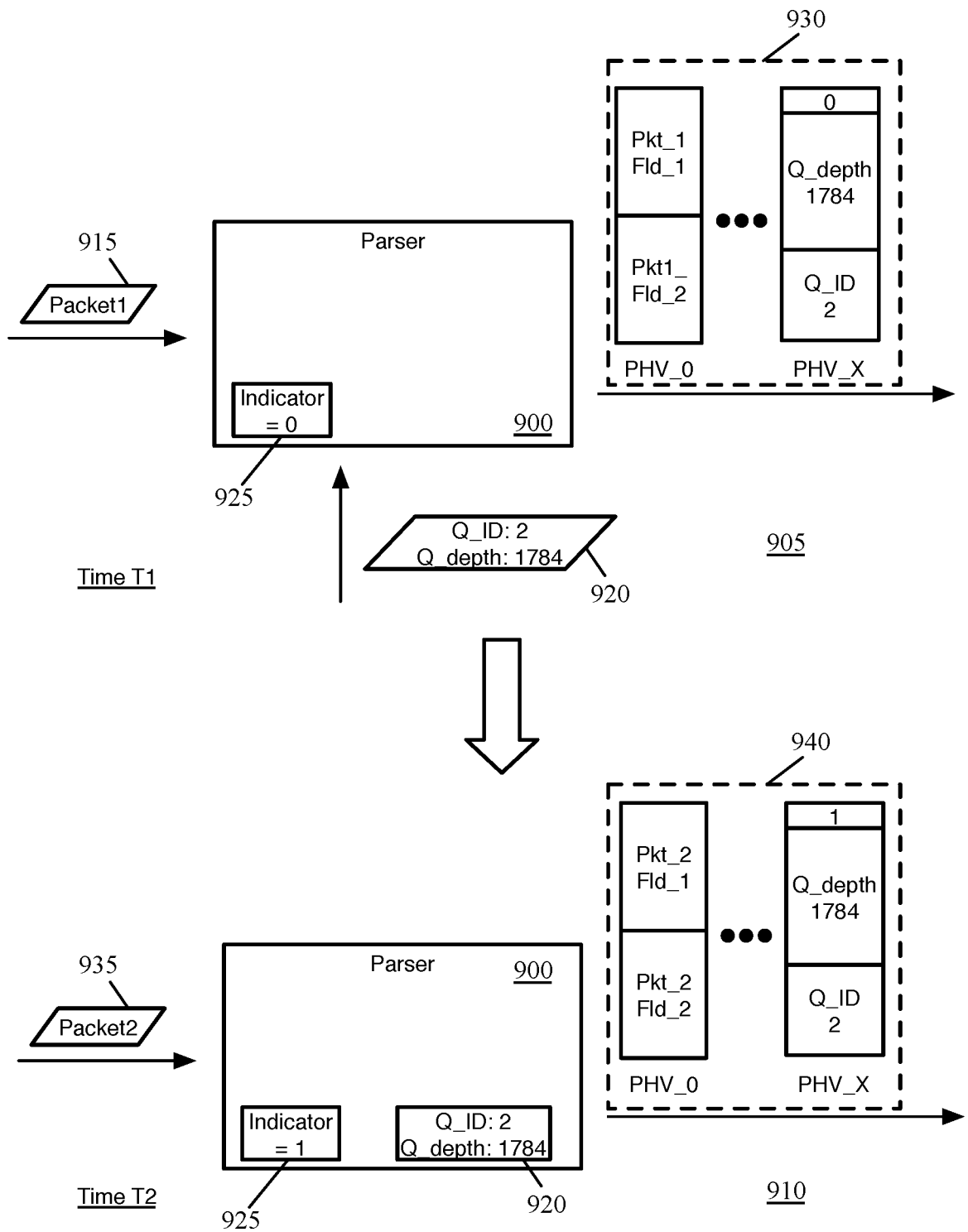
FIGS. 9-11 conceptually illustrate the storage of non-packet data in two copies of a stateful table by a packet processing pipeline over the course of several clock cycles.
Figure 10:
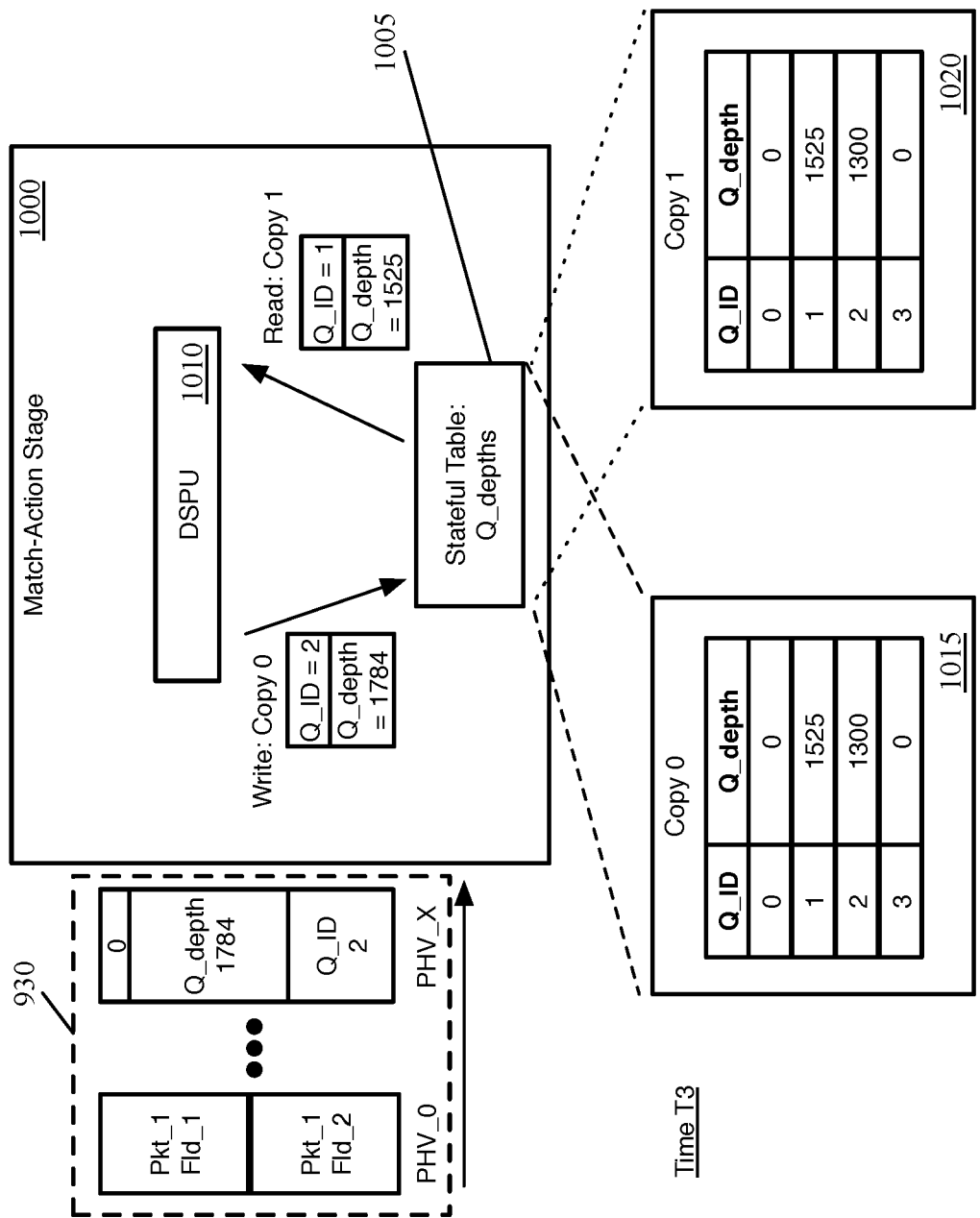
Figure 11:
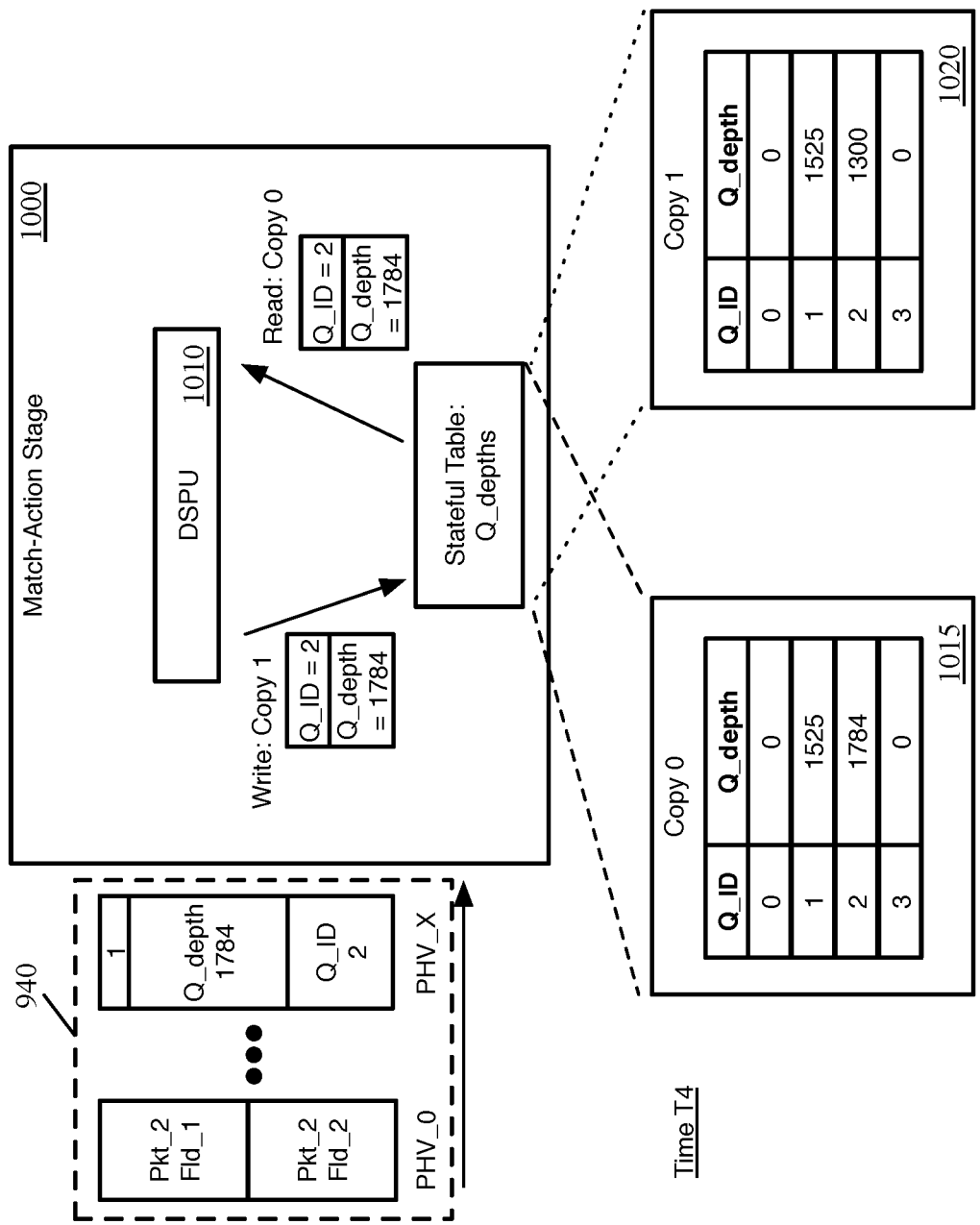

FIGS. 9-11 conceptually illustrate the storage of non-packet data in two copies of a stateful table by a packet processing pipeline over the course of several clock cycles. FIG. 9, specifically, illustrates a parser 900 sending two copies of a piece of non-packet data into the packet processing pipeline along with two different packets, over two stages 905 and 910. In this example and several others described herein, the non-packet data shown is queue state data (e.g., current depth of a specific queue). However, it should be understood that other types of data (e.g., buffer usage data) may be stored in the stateful tables of a packet processing pipeline in various different embodiments.

In the first stage 905 (showing a clock cycle T1), the parser 900 receives a first packet 915 as well as a piece of stateful internally-generated non-packet data 920. This non-packet data 920 provides the current (or at least recent) state of queue 2. In this case, the parser 900 does not have a built-up input queue for either packets or non-packet data, and thus can process this data right away. The parser 900 also keeps track of an indicator bit 925, which is currently set to 0. This indicator bit alternates, in some embodiments, each time non-packet data is sent into the pipeline in a PHV container.

The parser 900 outputs a PHV 930 that includes several data containers storing various packet header fields of the packet 915, as well as a data container for the queue state information 920. This data container stores the queue identifier (2), the queue depth (1784), and the indicator bit (0). In some embodiments, the size of the queue depth and queue identifier are such that this data, along with an indicator bit, fits within a single PHV container (e.g., a 32-bit PHV container). This PHV 930 is sent to the first match-action stage in the ingress pipeline.

In the second stage 910 (at a later clock cycle T2, which could be the next clock cycle after T1 or a later clock cycle), the parser 900 still stores the non-packet queue state data 920, as this data has not yet been sent to the pipeline twice. The indicator bit 925 is set to 1 rather than 0 at this point. In addition, the parser 900 receives a second packet 935, and outputs a PHV 940 including several data container storing various header fields of the packet 935 as well as the data container for the queue state information. This queue state data container stores the same data as its corresponding container in the first PHV 930, except that the indicator bit is 1 rather than 0. This PHV 930 is then sent to the first match-action stage in the ingress pipeline.

FIG. 10 conceptually illustrates the processing of the first PHV 930 by a match-action stage 1000 that includes the stateful table 1005 that stores the non-packet data (at least the queue depth information). This occurs, as shown, at a clock cycle T3, which is after T1, but may occur before, after, or at the same time as T2, depending on the number of clock cycles between T1 and T2 and the number of match-action stages before the stage 1000.

In addition to any other operations the match-action stage performs on the packet, FIG. 10 illustrates that the DSPU 1010 (or set of DSPUs) both reads from and writes to the two different copies of the stateful table in this clock cycle. As mentioned above, the DSPU 1010 may represent multiple DSPUs within the match-action stage (e.g., one DSPU that performs the read operation and another that performs the write operation). In some other embodiments, the DSPU performs one of the read and write operations while another of the match-action components performs the other of these operations. In this example, the DSPU writes the queue state data to the first copy 1015 (copy 0) of the stateful table 1005, based on the indicator bit in the data container with the queue state data. Also based on this indicator bit, the DSPU 1010 reads from the second copy 1020 (copy 1) of the stateful table. The entry for queue 1 is selected based on one or more of the packet header fields or other associated packet data stored in the ingress data containers of the PHV 930, in some embodiments.

FIG. 11 conceptually illustrates the processing of the second PHV 940 by the match-action stage 1000. As shown, this occurs at clock cycle T4, which is after both T2 and T3 (in some embodiments, the difference between T3 and T1 is the same as the difference between T4 and T2). In addition, due to the write operation performed in clock cycle T3, the first copy 1015 of the stateful table stores a queue depth of 1784 for queue 2, while the second copy 1020 still stores the old queue depth 1300. This old queue depth should never be read, because the next PHV received by the match-action stage after the first copy of the table is updated should always carry the update to the second copy of the table.

In the clock cycle T4, the DSPU 1010 again both reads from and writes to the two different copies of the stateful table. In this case, the DSPU 1010 writes the queue state data to the second copy 1020 (copy 1) of the stateful table based on the indicator bit in the data container with the queue state data. The DSPU 1010 also reads the recently updated data for queue 2 from the first copy 1015 (copy 0), based on the packet header fields or other ingress PHV data identifying this as the relevant table entry to read. More details on writing to and reading from specific stateful table locations for specific applications will be described below.

Figure 12:
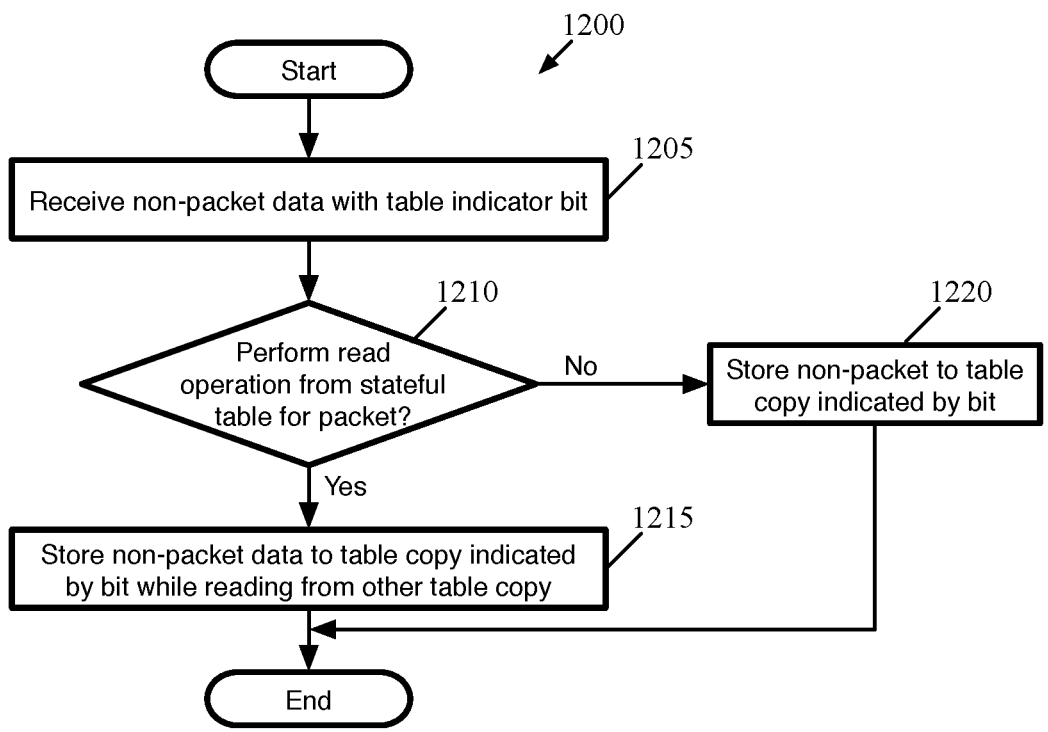
FIG. 12 conceptually illustrates a process of some embodiments performed by a match-action stage that stores non-packet data in stateful tables.

FIG. 12 conceptually illustrates a process 1200 of some embodiments performed by a match-action stage that stores non-packet data in stateful tables. In some embodiments, the process is performed by the DSPU of the match-action stage to store non-packet data received by the match-action stage in the appropriate copy of the stateful table. As shown, the process 1200 begins by receiving (at 1205) non-packet data along with a table indicator bit. This data is received in one or more data containers of a PHV that are allocated to the non-packet thread. In some embodiments, depending on whether an ingress packet was available, the received PHV either may or may not also include ingress packet data.

The process 1200 determines (at 1210) whether to perform a read operation from the stateful table for any packet data received with the non-packet data. If no packet data is included in the PHV, then a read operation will generally not be required. In addition, some embodiments only perform a read operation from the stateful table for certain packets. For instance, if a previous match-action stage has indicated that the packet is to be dropped, there may be no need to read information from a stateful table for the packet. Furthermore, as described in more detail below, in some embodiments each entry in the stateful table stores queue depths for a group of associated queues (e.g., queues in a link aggregation group). If a packet is assigned to a single queue, some embodiments do not read from the stateful table.

If a read operation is to be performed, the process 1200 stores (at 1215) the received non-packet data to the copy of the table identified by the received indicator bit, while simultaneously reading from the other copy of the table. On the other hand, if no read operation is required for the current clock cycle, the process stores (at 1220) the received non-packet data to the copy of the table identified by the received indicator bit without performing a read operation from the table.

As mentioned, each match-action stage in some embodiments includes a stateful processing unit (the DSPU) that accesses and uses the stateful tables. These DSPUs operate in the data plane at the line rate of the network forwarding IC. In some embodiments, at least a subset of the stateful processing units can be configured to receive a set of entries stored in a memory location of a stateful table and identify either a maximum or minimum value from the set of entries. For example, each memory location might be a 128-bit RAM word, storing eight 16-bit or sixteen 8-bit values.

Figure 13:
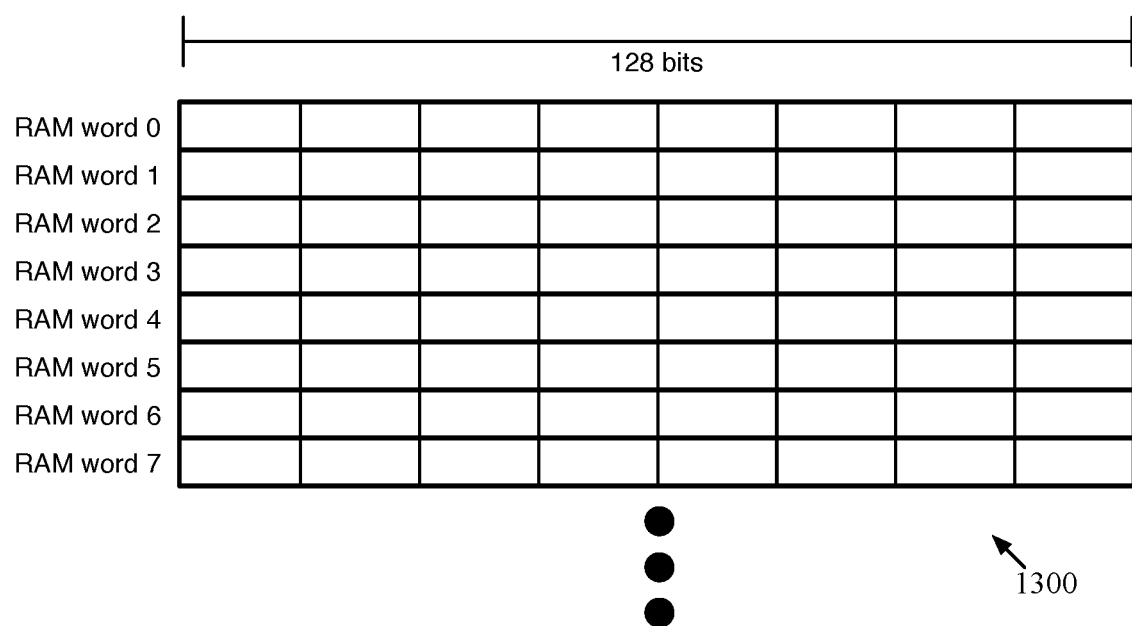
FIG. 13 conceptually illustrates an example of a stateful table loaded into a match-action stage memory.

FIG. 13 conceptually illustrates an example of such a stateful table 1300 loaded into a match-action stage memory. As shown, the stateful table includes numerous RAM words that are each 128-bits wide. In this case, each RAM word is divided into eight 16-bit entries. These entries could store, e.g., queue depths. For instance, a single RAM word might store queue depth values for eight queues that form a link aggregation group (LAG).

A previous match-action stage (based on, e.g., analysis of various packet header fields) specifies a particular memory location, then the data plane stateful processing unit retrieves the RAM word at the specified location and, according to its configuration, outputs the maximum or minimum value of the multiple values stored in the RAM word and/or the location of this maximum/minimum value within the RAM word. This identified maximum or minimum value and/or its location within the RAM word can be stored in a data container and sent to the next match-action stage for further processing if needed.

Figure 14:
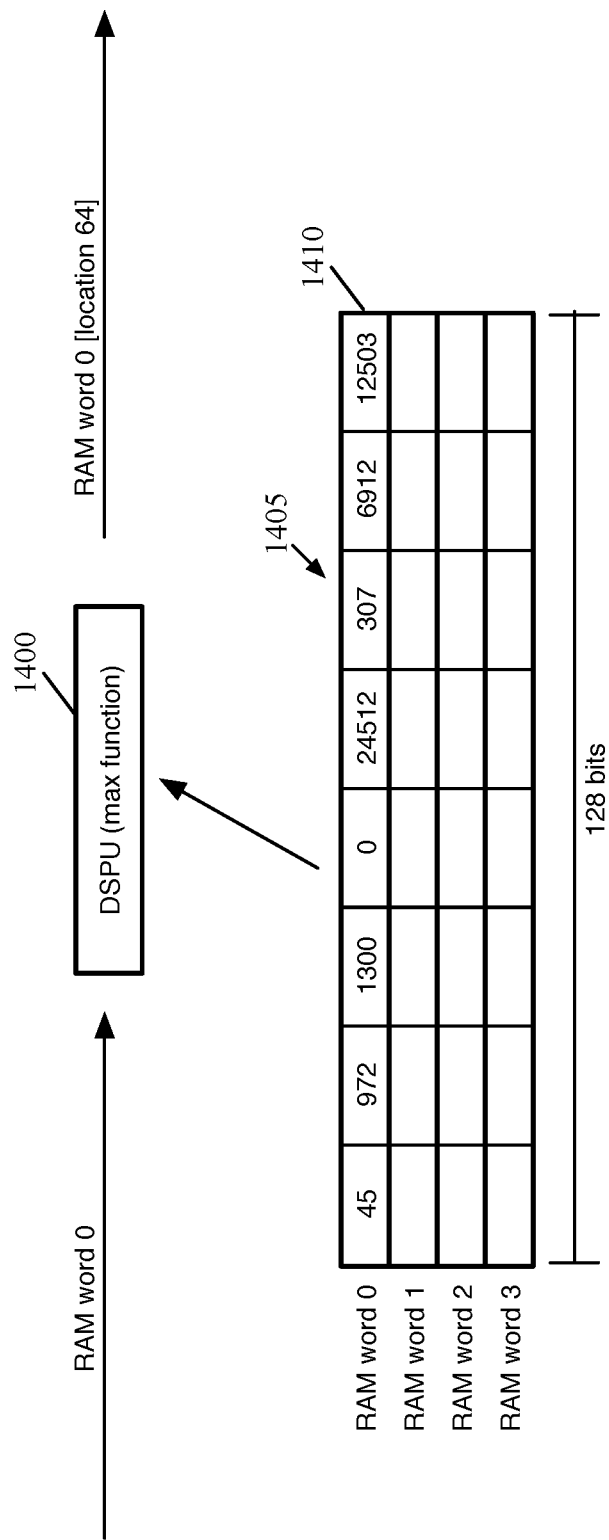
FIG. 14 conceptually illustrates an example of an operation by a DSPU of a match-action stage, configured to identify a maximum value from a given RAM word.

FIG. 14 conceptually illustrates an example of such an operation by a DSPU 1400 of a match-action stage, configured to identify a maximum value from a given RAM word. As shown, the DSPU 1400 receives as input an identifier for the RAM word (in this case word 0) of its associated stateful table 1405 from which to identify the maximum value. The DSPU 1400 reads this identified RAM word 1410, which is divided into eight 16-bit entries. These entries store the values 45, 972, 1300, 0, 24512, 307, 6912, and 12503. In this case, the fifth entry (with the value 24512) is identified by the DSPU 1400 as having the maximum value, and the DSPU outputs the specific location within the word. In some embodiments, as shown, the location is identified by the RAM word (word 0) and the starting location within that word (the $65^{th}$ bit, or bit 64).

In addition, as described in greater detail below for the specific case of storing queue state information in the stateful tables, in some cases a group of related entries may be too large to store in a single RAM word. In this case, some embodiments divide the group of related entries across multiple RAM words, and a previous match-action stage selects among these RAM words (using, e.g., a hash of various packet header fields or other pseudo-random selection mechanism). In some embodiments, the entries can vary over time between valid and invalid, and a previous match-action stage stores a bitmask for each RAM word that identifies the entries of a RAM word as valid or invalid.

The above describes various operations of the packet processing pipelines of a network forwarding IC of some embodiments for handling non-packet data internally generated on the network forwarding IC. In different embodiments, this non-packet data (which could be state data about a component or could even resemble packet data) may be generated by different circuitry of the IC. For instance, the ingress pipelines could generate data to be processed by the egress pipelines separately from packets, and vice versa. Mirror buffers could generate data regarding their state to be stored and used by ingress and/or egress pipelines, etc.

In some embodiments, the non-packet data is generated by the traffic management unit and sent to the ingress pipelines to be stored in the stateful tables and subsequently used by the ingress pipelines. The traffic manager of some embodiments includes numerous queues for each egress pipeline, which store packets after ingress processing until the packet is released to its egress pipeline. Each of the queues corresponds to a particular port of the hardware forwarding element (with multiple queues per port), each of which in turn corresponds to one of the packet processing pipelines. These queues may fill up if the ingress pipelines are sending packets to certain queues of the traffic manager faster than the egress pipelines can process the packets. For example, even if all of the pipeline stages are processing one packet per clock cycle, if multiple ingress pipelines are regularly sending packets to queues for the same egress pipelines, these queues may fill up.

In some embodiments, the traffic manager generates queue state data and sends this queue state data to one or more of the packet processing pipelines. As shown above (e.g., in FIGS. 9-11), the queue state data includes the queue depth (i.e., the amount of data stored in the queue) and a queue identifier in some embodiments, though in other embodiments the traffic manager may generate and transmit other types of queue state information for the packet processing pipelines. However, the traffic management unit may include a large number (e.g., several thousand) queues, and so it is not necessarily efficient to send queue state updates every time a packet is added to or released from a queue. Instead, some embodiments set specific thresholds for the queues (either collectively or individually) and send queue state updates to the packet processing pipelines only when one of the queues passes one of its thresholds.

Figure 15:
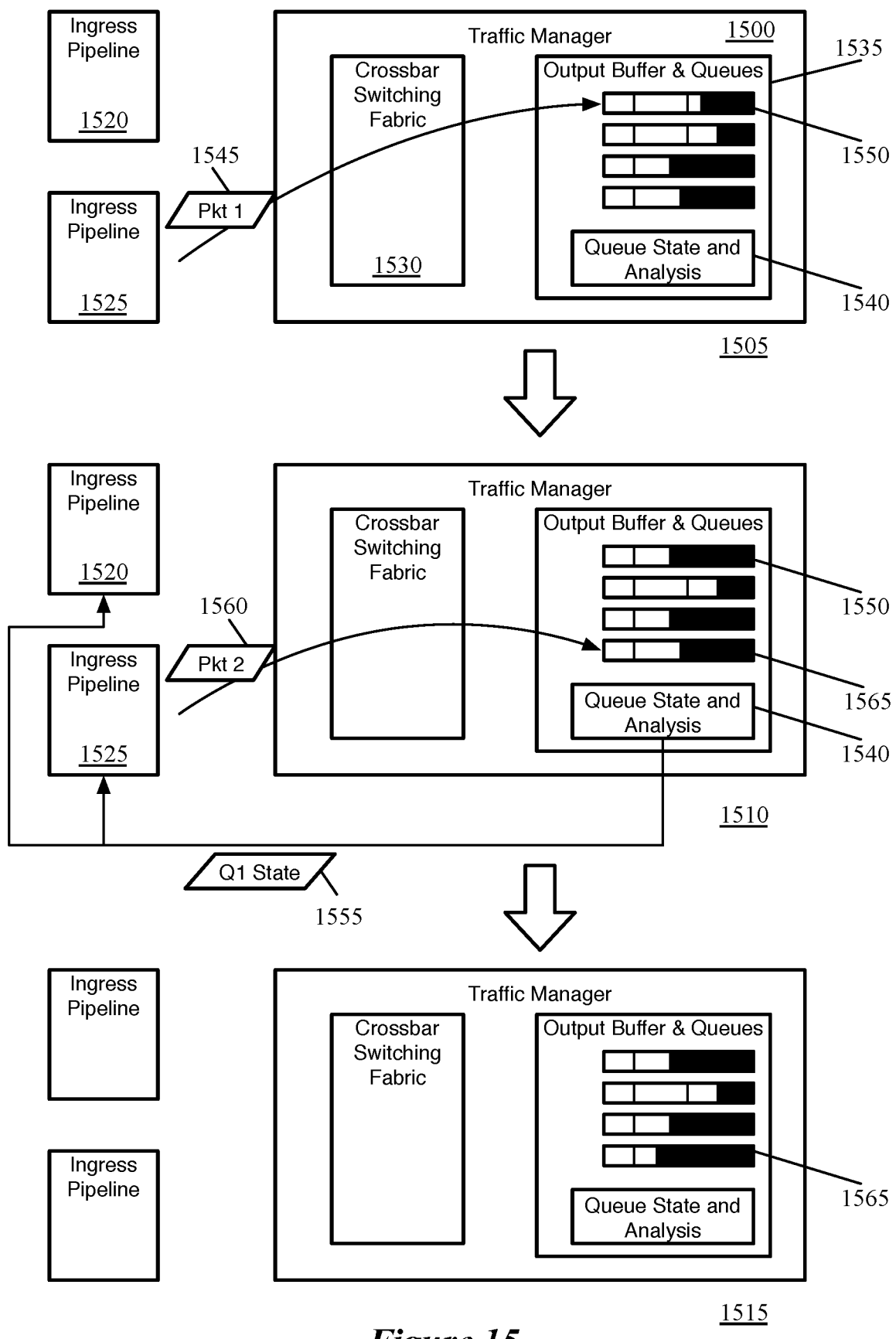
FIG. 15 conceptually illustrates an example of a traffic manager receiving packets and transmitting queue state updates to ingress pipelines.

FIG. 15 conceptually illustrates an example of a traffic manager 1500 receiving packets and transmitting queue state updates to ingress pipelines 1520 and 1525 over three stages 1505-1515. As shown in the first stage, the traffic manager 1500 includes crossbar switching fabric 1530 and output buffer and set of queues 1535. The crossbar switching fabric 1530 directs a packet received from one of the ingress pipelines to a specific queue of the traffic manager.

The set of queues 1535 shows only four queues for simplicity, though a typical traffic manager will include many more queues than this. These queues are each illustrated with a portion filled in to indicate the amount of the queue that is currently occupied. In addition, each queue is drawn with vertical lines that illustrate thresholds monitored by the traffic manager. While in this example the thresholds are the same for all of the queues, in some embodiments these thresholds are individually configurable. An administrator can choose to have all of the queues monitored with the same set of thresholds, to only monitor thresholds on certain queues, and even to set the thresholds for different queues to different queue depths. The traffic manager 1500 additionally includes a queue state and analysis unit 1540 for monitoring whether the queues have crossed any of their respective thresholds.

In the first stage 1505, the second ingress pipeline 1525 completes processing a packet 1545 and provides this packet to the traffic manager 1500. Based on information received with the packet from the ingress pipeline 1525, the traffic manager 1500 adds the packet to a first queue 1550. The second stage 1510 illustrates that, as a result of adding the packet to this first queue 1550, the queue depth has crossed a threshold. Thus, the queue state and analysis unit 1540, that stores queue depth information and identifies when thresholds are crossed, sends the current state 1555 of the first queue 1550 to the ingress pipelines 1520 and 1525. In some embodiments, the traffic manager 1500 uses a broadcast mechanism to send the queue state information to the ingress pipelines via a bus between the traffic manager and the ingress pipelines.

Also at the second stage 1510, the ingress pipeline 1525 completes processing a second packet 1560 and provides this packet to the traffic manager 1500. Based on information received with the packet from the ingress pipeline 1525, the traffic manager 1500 adds the packet to the fourth queue 1565. The third stage 1515 illustrates that the queue depth of the fourth queue 1565 has increased as a result of this new packet, but has not crossed a threshold. As such, the queue state and analysis unit 1540 does not send any queue state information to the ingress pipelines as a result of the second packet 1560.

FIG. 15 illustrates that the traffic manager sends a queue state update when a queue receives a packet that causes the queue depth to increase past a threshold. In some embodiments, the traffic manager sends such an update either when a queue receives a packet and thus its queue depth increases past a threshold or releases a packet (to an egress pipeline) and thus its queue depth decreases below a threshold.

Figure 16:
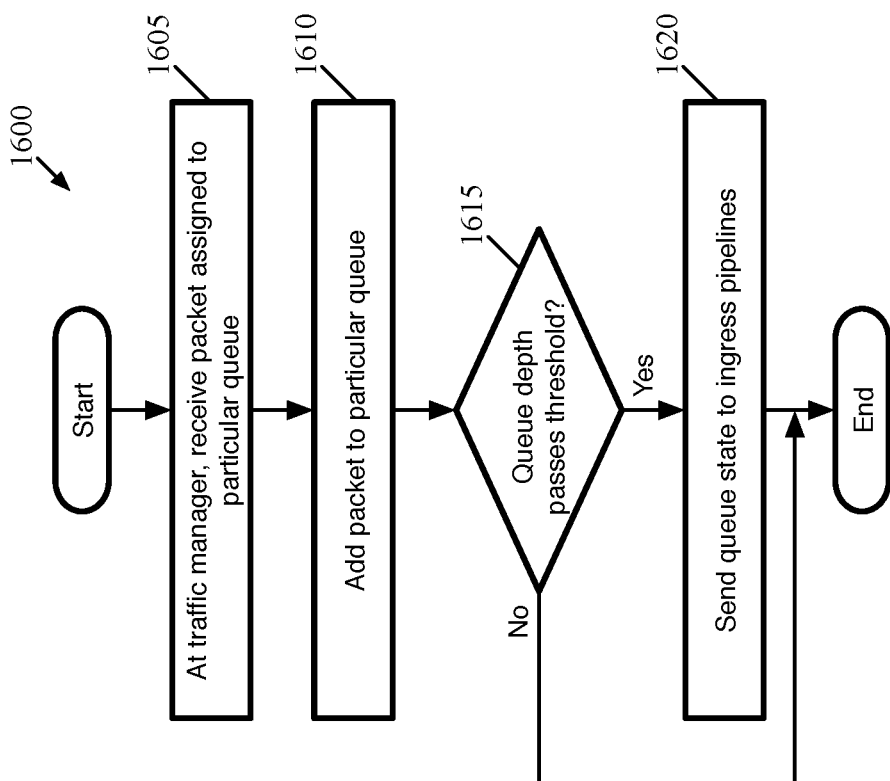
FIG. 16 conceptually illustrates a process of some embodiments for determining whether to send a queue state update when a packet is received.

FIG. 16 conceptually illustrates a process 1600 of some embodiments for determining whether to send a queue state update when a packet is received. This process 1600 is performed by a queue depth analysis unit of a traffic manager in some embodiments. As shown, the process 1600 begins by receiving (at 1605) a packet assigned to a particular queue at the traffic manager. In some embodiments, this packet is received from one of several ingress pipelines. The ingress pipeline that processes the packet assigns the packet to a queue based on the packet's destination address and/or other factors).

The process 1600 adds (at 1610) the packet to the particular queue to which the packet is assigned, which results in a change to the extent to which that particular queue is filled (its queue depth). The process also determines (at 1615) if the queue depth of the particular queue passes a threshold as a result of the packet being added. As noted above, in some embodiments the thresholds may be configured specifically for each queue, while in other embodiments the thresholds are fixed at the same level(s) for each queue.

If the queue depth passes a threshold, the process 1600 sends (at 1620) the queue state to the ingress pipelines of the network forwarding IC. The queue state sent by the traffic manager may be an identifier for the queue along with the queue depth, or a different queue state indicator (e.g., an indicator that the queue has passed the threshold, without a specific value). As mentioned, in some embodiments, the traffic manager broadcasts this queue state to all of the ingress pipelines.

Figure 17:
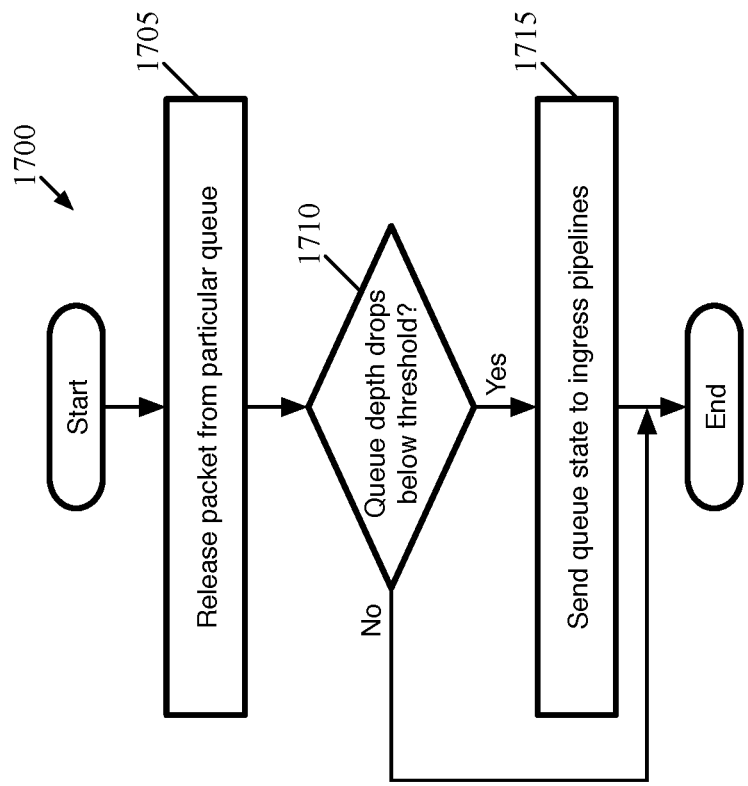
FIG. 17 conceptually illustrates a process of some embodiments for determining whether to send a queue state update when a packet is released from a queue.

FIG. 17 conceptually illustrates a process 1700 of some embodiments for determining whether to send a queue state update when a packet is released from a queue. This process 1700 is performed by a queue depth analysis unit of a traffic manager in some embodiments. As shown, the process 1700 begins by releasing (at 1705) a packet from a particular queue. In some embodiments, the traffic manager includes a scheduler that determines (based on various factors) from which queue a packet should be released to each ingress pipeline for each clock cycle.

The process determines (at 1710) whether the queue depth of the particular queue drops below a threshold as a result of the packet being released. As noted above, in some embodiments the thresholds may be configured specifically for each queue, while in other embodiments the thresholds are fixed at the same level(s) for each queue.

If the queue depth drops below a threshold, the process 1700 sends (at 1715) the queue state to the ingress pipelines of the network forwarding IC. The queue state sent by the traffic manager may be an identifier for the queue along with the queue depth, or a different queue state indicator (e.g., an indicator that the queue has passed the threshold, without a specific value). As mentioned, in some embodiments, the traffic manager broadcasts this queue state to all of the ingress pipelines.

The traffic manager sends the queue state data to the ingress pipelines via a bus in some embodiments. Specifically, the network forwarding IC of some embodiments includes a bus that connects the traffic manager to the parser of each of the ingress pipelines. The traffic manager uses this bus to broadcast to each of the ingress pipelines each piece of queue state data that it generates.

Figure 18:
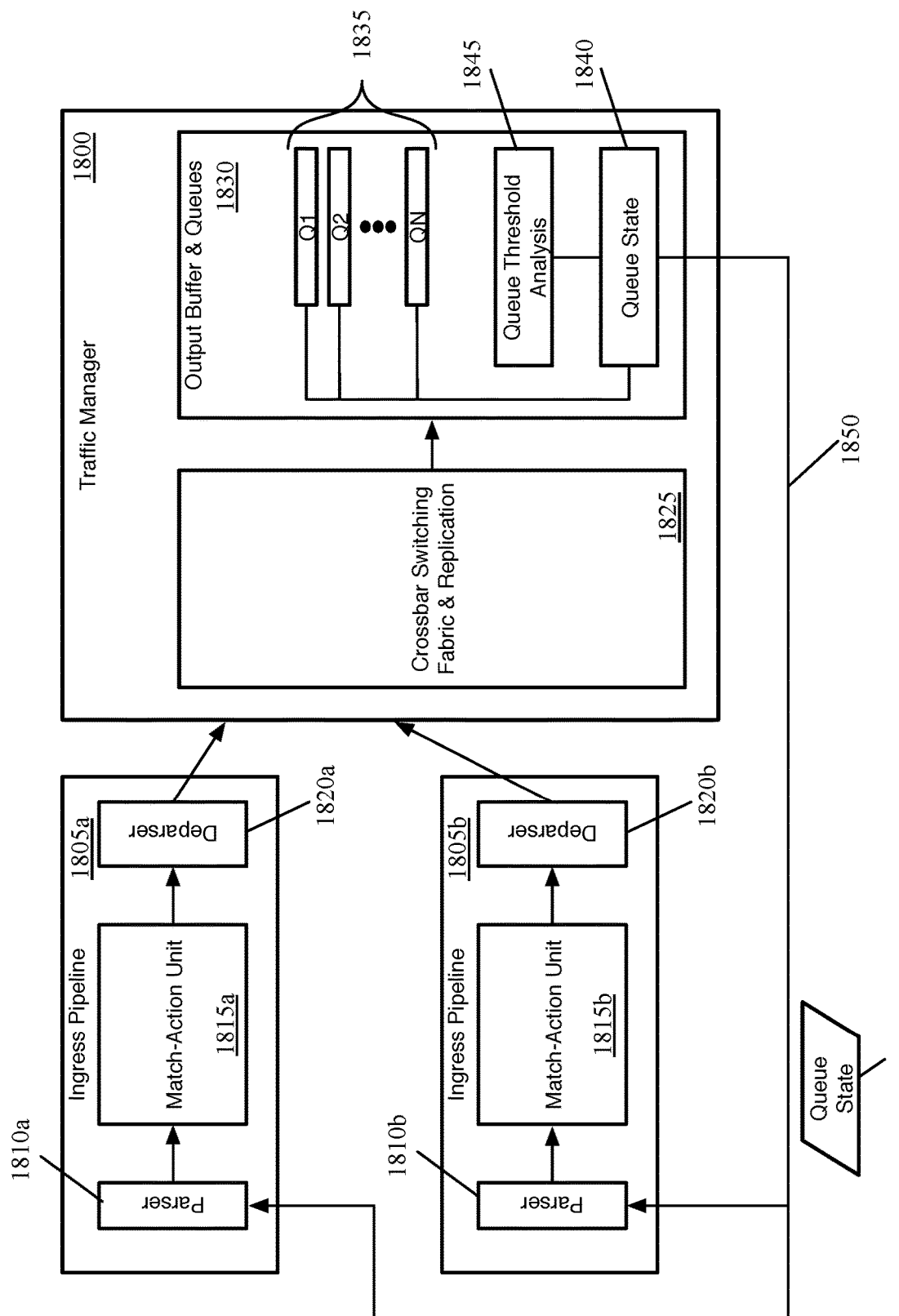
FIG. 18 conceptually illustrates a more detailed view of a traffic manager and ingress pipelines of a network forwarding IC of some embodiments.

FIG. 18 conceptually illustrates a more detailed view of a traffic manager 1800 and ingress pipelines 1805a and 1805b of a network forwarding IC of some embodiments. While this example illustrates two ingress pipelines, it should be understood that different embodiments include different numbers of packet processing pipeline circuitry that execute ingress threads. Each of the ingress pipelines 1805 includes a parser 1810, a match-action unit 1815, and a deparser 1820, as described above.

The ingress pipelines 1805 provide packets to the traffic manager 1800 along with queue assignments for those packets. The crossbar switching fabric and replication circuitry 1825 is responsible for directing these packets to the assigned queues, and for performing any required replication of the packet (e.g., for broadcast or multicast packets, etc.). The output buffer and queues 1830 includes the output buffer (not shown separately) that stores the actual packet data for a packet until the packet is released to an egress pipeline, in some embodiments, as well as the multiple queues 1835 that store pointers to the packet data in the output buffer.

The queues are connected in some embodiments to queue state circuitry 1840 that monitors the state of each of the queues 1835. In some embodiments, each queue event (e.g., addition of a packet from the ingress pipeline, release of a packet to an egress pipeline) causes the queue state for the affected queue to update. The queue state circuitry 1840, in some embodiments, includes storage (e.g., RAM) that stores the queue depth and/or other state information for each of the queues 1835.

The queue threshold analysis unit 1845 of some embodiments analyzes each change to the queue state 1840 to determine whether a threshold has been passed. The queue threshold analysis unit 1845 can be configured, in some embodiments, to monitor only the state of specific identified queues or of all queues. Monitoring every queue may create significant latency between a queue passing a threshold and the new queue state being stored in the stateful table of the ingress pipeline. Thus, if an administrator is concerned about a specific subset of queues, the queue threshold analysis unit 1845 can be configured to only monitor this subset of queues, thereby reducing the latency of the state updates for the monitored queues (as there will be less queue state data backed up at the ingress pipeline parsers). In addition, the queue threshold analysis unit 1845 can be configured with specific thresholds for specific queues in some embodiments (e.g., different thresholds for different queues), while in other embodiments the thresholds are fixed.

The network forwarding IC also includes a bus 1850 that connects the traffic manager to the parsers 1810 of the ingress pipelines 1805. When the queue threshold analysis 1845 determines that the queue state for a particular queue has crossed a threshold (e.g., the queue depth has increased past a threshold or decreased below a threshold), the queue state for that particular queue is transmitted to each of the ingress pipelines via the statistics bus 1850. The parser combines this queue state input (a particular type of internally-generated non-packet data) with its packet input in some embodiments to generate the PHV for a particular clock cycle, as described above.

In some embodiments, as described above, the different ingress pipelines 1805 dispatch the received queue state data 1855 at different rates. When a first ingress pipeline receives packets at a faster rate than a second ingress pipeline, the first pipeline may send out the queue state data more quickly.

In some embodiments, the parsers 1810 store the queue state data in a size-limited first-in-first-out (FIFO) queue, and send acknowledgments back to the traffic manager each time a piece of the queue state data is pushed into the pipeline via a PHV. This allows the traffic management unit to keep track of whether any of the pipelines' FIFO queues are filled, and hold off on broadcasting the queue state data until all of the pipelines are capable of receiving the data.

Figure 19A:
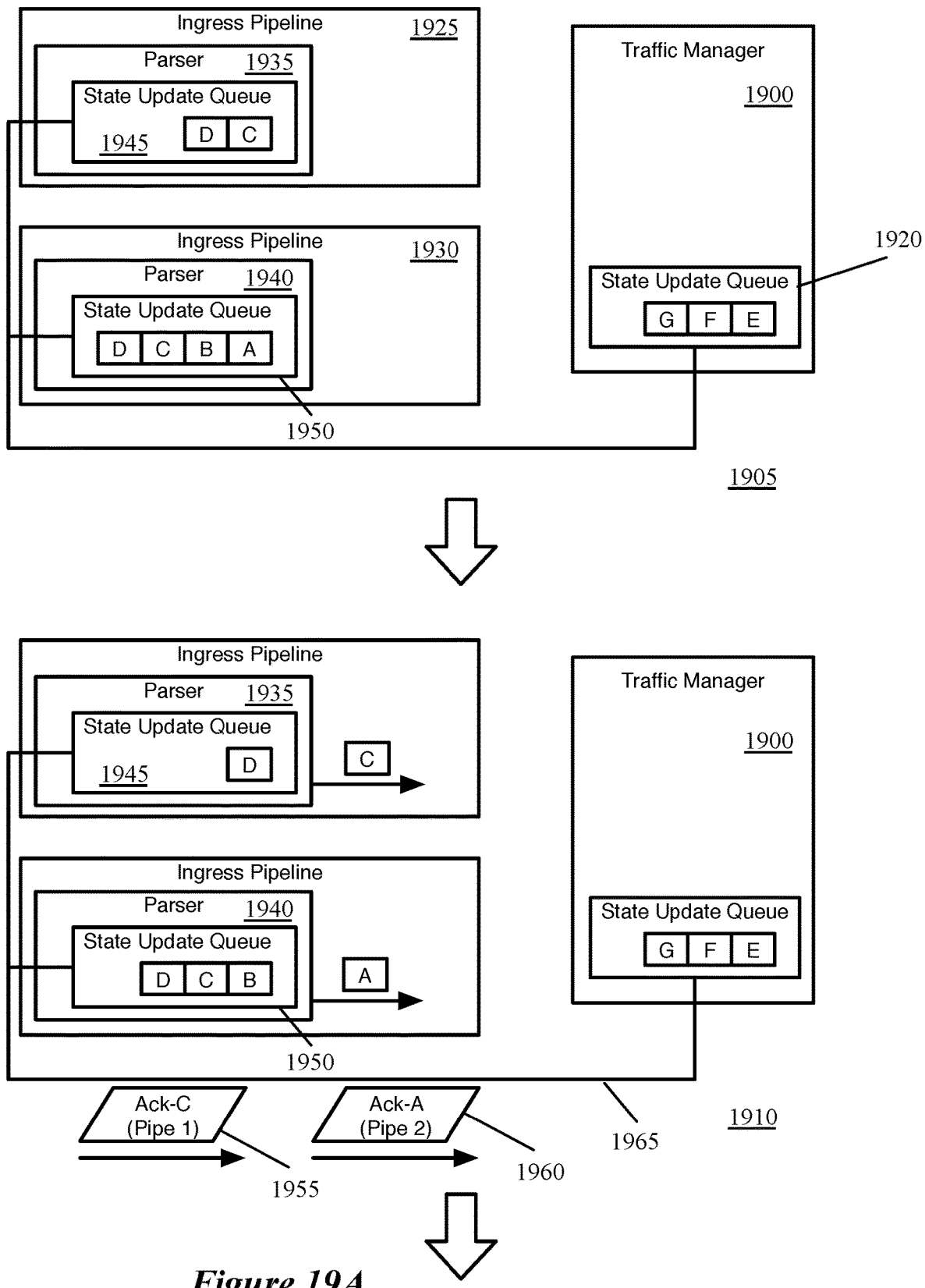
FIGS. 19A-B conceptually illustrate an example of a traffic manager waiting to broadcast state updates to the ingress pipelines until all of the ingress pipelines have available space to receive the state updates.
Figure 19B:
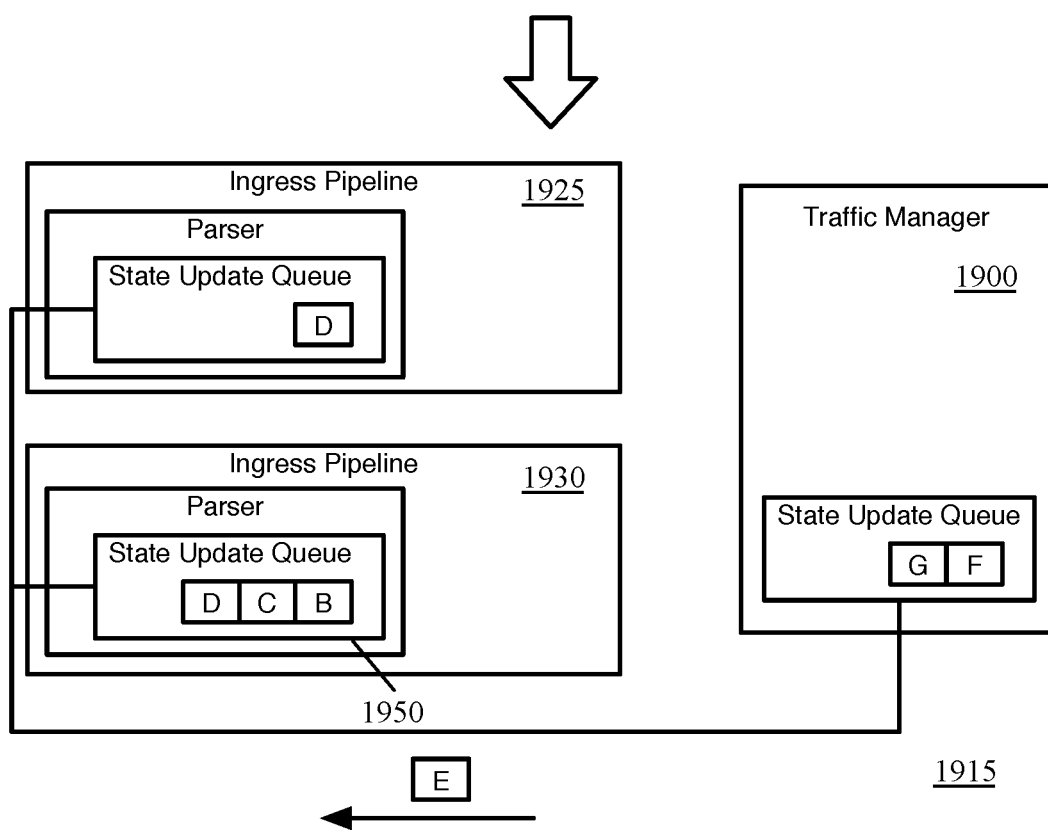

FIGS. 19A-B conceptually illustrate an example of a traffic manager 1900 waiting to broadcast state updates to the ingress pipelines until all of the ingress pipelines have available space to receive the state updates, over three stages 1905-1915. As shown in the first stage 1905, the traffic manager 1900 includes (among other entities) a state update queue 1920. The traffic manager state update queue 1920 stores state updates (e.g., queue state updates) to be sent to the ingress pipelines as internally-generated non-packet data. If the ingress pipeline parsers are able to send out the state updates into the match-action stages as quickly as the updates are received, then the state update queue 1920 will remain empty. However, as described above, each update is sent to the match-action unit twice in some embodiments, in order for the match-action unit to update both copies of a stateful table. Furthermore, the parsers may not send out the state updates to the match-action unit every clock cycle, if packets are not being received at that high a rate. At the first stage, the traffic manager state update queue 1920 stores three separate updates, labeled as updates E, F, and G.

This first stage 1905 also illustrates two ingress pipelines 1925 and 1930, only showing the parsers 1935 and 1940 of these two pipelines for simplicity. The parsers 1935 and 1940 each include their own state update queues 1945 and 1950, respectively. For this example, each of these state update queues 1945 and 1950 can hold four pieces of state data. The state update queue 1945 for the first parser 1935 currently holds two state updates, labeled as updates C and D. Meanwhile, the second state update queue 1950 for the second parser 1940 is currently filled up, holding four state updates labeled as updates A, B, C, and D. Here, the first ingress pipeline 1925 has been sending the state updates to its match-action unit faster than the second egress pipeline 1930 (due to, e.g., the first ingress pipeline 1925 receiving packets at a faster rate than the second ingress pipeline 1930). In addition, a statistics bus 1965 transmits state updates from the traffic manager 1900 to the ingress pipeline parsers 1935 and 1940.

In the second stage 1910, both of the ingress pipeline parsers 1935 and 1940 release the first state update from their respective state update queues 1945 and 1950. The first parser 1935 sends state update C to the match-action pipeline (either with an ingress packet or on its own) while the second parser 1940 sends state update A to the match-action pipeline (either with an ingress packet or on its own). This causes both of these parsers to remove the state updates from the respective state update queues 1945 and 1950 (if each state update is sent to the match-action unit twice, it can be assumed that in both cases this is the second time the update is being sent).

In addition, each of the parsers 1935 and 1940 sends an acknowledgment to notify the traffic manager 1900 that these state updates have been removed from their respective state update queues. The first parser 1935 sends an acknowledgment 1955 for state update C while the second parser 1940 sends an acknowledgment 1960 for state update A. In this figure, the acknowledgments are shown as being transmitted to the traffic manager via the statistics bus 1965. However, in other embodiments, a separate connection exists between each ingress pipeline parsers and the traffic manager. In some such embodiments, each parser has a separate connection back to the traffic manager, as the parsers may send state updates to their respective match-action units at different times. Some embodiments use the packet processing path to provide this information to the traffic manager, although this may take multiple clock cycles for the information to reach the traffic manager.

The third stage 1915 illustrates that the traffic manager 1900 has received the state update sent acknowledgments 1955 and 1960 from the ingress pipelines. Because the second ingress pipeline's state update queue 1950 now has an available space for another update, the traffic manager 1900 broadcasts the next update in its queue (state update E) to the ingress pipelines 1925 and 1930. Though not shown in this stage, the ingress pipeline parsers 1935 and/or 1940 could send their respective next state updates to their respective match-action units in this clock cycle as well, in some embodiments (though if required to send each twice, they would not yet be able to remove an update from their queues).

After a packet processing pipeline (e.g., the parser of such a pipeline) receives the queue state data, the pipeline adds the packet to a PHV data container for a non-packet thread that parallels the ingress thread in some embodiments. The use of the separate non-packet thread and the storage of this queue state data to stateful tables (e.g., to multiple copies of these stateful tables) is described in detail above. This stored data can then be used by subsequent packet processing threads (e.g., subsequent ingress threads) to process packets (e.g., to make queue selection decisions).

In order to store the queue state data to a stateful table, in some embodiments a first match-action stage (though not necessarily the first stage in the pipeline) identifies the memory location (e.g., the RAM word and the location within the RAM word) to which to store the queue state data based on the queue identifier in the PHV data container with the queue state. For instance, this first stage might use a table that maps queue state identifiers to memory locations, as specific non-consecutive queues may need to be grouped together within a RAM word (e.g., if the queues are part of a link aggregation group (LAG)). A subsequent stage of the pipeline performs the write operation to write the queue state to the specified memory location.

In some embodiments, a queue state might be stored in multiple locations, and thus a first stage could map the queue state to more than one location. Because the DSPU in a single stage may not be able to write to multiple addresses at once, some embodiments use stateful tables in multiple stages to store this data (i.e., with two copies of the stateful table in each of these stages). Some embodiments use the same data stored in the different stages for different purposes (e.g., a first stage used for queue assignment and a second stage used to store the queue data in a packet in order to transmit the queue data through the network).

Figure 20:
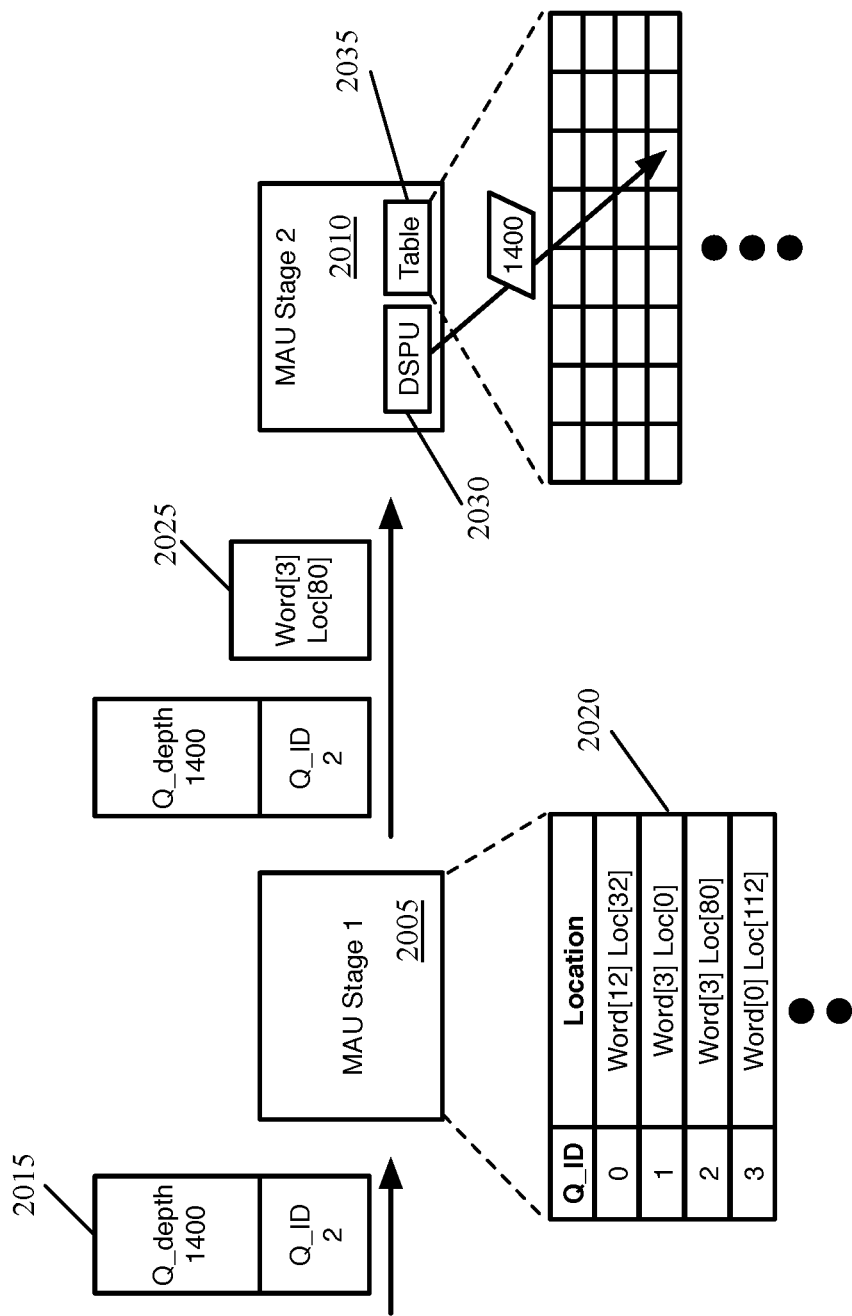
FIG. 20 conceptually illustrates two match-action stages of a packet processing pipeline that perform non-packet data thread operations to store queue state information in a stateful table.

FIG. 20 conceptually illustrates two match-action stages 2005 and 2010 of a packet processing pipeline that perform non-packet data thread operations to store queue state information in a stateful table. The first match-action stage 2005 receives the non-packet data (a queue identifier and queue depth) in a PHV data container 2015. This first match-action stage 2005 may or may not be the first stage of the packet processing pipeline, but is the first stage to perform non-packet thread operations in some embodiments. In addition, though not shown, the match-action stage 2005 may also be configured to perform ingress thread operations.

The first match-action stage 2005 maps the queue identifier stored in the PHV data container 2015 to a stateful table location in the later match-action stage 2010. As shown by the conceptual table 2020, each queue identifier maps to a location (shown as a RAM word and starting bit location within that RAM word). In some embodiments, these mappings are implemented as match table entries and corresponding action entries. That is, in some embodiments the non-packet thread match tables of the match-action stage 2005 match on the queue identifier parameter of the non-packet data. These entries refer to action instructions that specify to write the corresponding location (e.g., RAM word and bit location) to another non-packet data container 2025 of the PHV. In this case, the queue identifier value (2) maps to starting bit location 80 in RAM word 3 (i.e., the sixth 16-bit entry in the fourth RAM word). Although the received internally-generated non-packet data only requires one PHV data container in some embodiments, additional PHV data containers may be allocated to the non-packet thread in order to store data that is passed between match-action stages, as in this case.

The non-packet data containers 2015 and 2025 are passed to the second match-action stage 2010. This second stage 2010 is not necessarily directly subsequent to the first match-action stage 2005, as intervening stages that perform ingress thread operations might exist (as shown below, additional preparation steps for the ingress thread might be required before reaching the stage that stores the queue state tables). In the second stage 2010, the DSPU 2030 writes the queue depth value from the non-packet PHV data container 2015 to the location in the stateful table 2035 specified by the second non-packet PHV data container 2025. Thus, as shown in the figure, the DSPU 2030 writes the value 1400 (the current queue depth of queue ID 2) to the sixth entry (starting at bit location 80) of the fourth RAM word in the stateful table 2035, thus updating the stateful table with the 2035. If two copies of the stateful table 2035 are used, a subsequent PHV would include the same data and update the other copy of the stateful table.

In some embodiments, the queue state received from the traffic manager is larger than the allocated memory space (i.e., the 8-bit, 16-bit, etc. RAM word entries). In this case, an additional match-action stage prior to the write operation (or an operation within the same match-action stage as the write operation) is used to scale the queue state data to the appropriate size. In different embodiments, this can involve a range mapping operation or simply removing the lowest order bits. If the queue depths are, for example, N-bit values (with N being slightly greater than sixteen) that are used by the ingress pipeline to identify a least congested queue, the lowest order bits can be removed with minimal effect on performance (if the first sixteen bits of two queue depths are the same, then the two queue depths are probably close enough to be treated as equal). Similarly, if a greater number of lowest order bits need to be removed (to get from N-bit queue depths to 8-bit entries), the first eight bits are the most important and can generally be used to make decisions. Some embodiments map the received queue state value into a set of ranges that are not on power of 2 boundaries, and thus slightly more complex operations are involved. To perform these range matches (e.g., in decimal, values 0-10 map to 1, 11-20 map to 2, etc.), some embodiments use TCAMs.

The ingress pipelines use the queue state data (e.g., queue depth) stored in the stateful tables for various operations in different embodiments. For instance, the ingress pipelines can assign packets to traffic manager queues based on the queue depths or make similar decisions based on queue latency (if that state information is provided to the ingress pipelines), intelligently drop packets for queues that are currently filled, etc. Some embodiments use the queue state data for queries regarding flow statistics, such as how often a particular queue (to which a specific flow is assigned) was filled past a threshold queue depth, or the percentage of queues (or a subset of queues) that are past a threshold queue depth at any given time. In some embodiments, the queue state data is not necessarily stored in stateful tables, and may be used directly by the ingress (or egress) packet thread processed synchronously with the non-packet queue state data.

Some embodiments retrieve the stored queue state data when processing subsequent packets and store this state data in one of the packet thread PHV data containers, so that the deparser stores the queue state data in a particular header field of the packet (e.g., an encapsulation header field repurposed to carry various types of state data). Using this mechanism, the packet carries the queue state data to its destination (or, using packet replication in the traffic management unit, a different destination). The destination can then extract the queue state data from the packet and use the queue state data for monitoring, event detection, or even to initiate changes to the network forwarding IC configuration or a data source.

As another example, the ingress pipelines of some embodiments assign packets to traffic manager queues based on the destination for the packet, and use the queue state data stored in the stateful tables to make these assignments. For example, as described above, some embodiments store the queue state for the multiple queues of a LAG within one RAM word (or a set of RAM words, if there are too many queues to fit in one RAM word). Once the ingress pipeline identifies the RAM word from which to select a queue, the stateful processing unit of some embodiments identifies the minimum queue depth within the RAM word, and outputs this location. A mapping (e.g., a match entry and corresponding action entry) in a subsequent stage maps the location to a particular queue (similar to the mapping used by the non-packet thread to map queue state data to a particular memory location, shown in FIG. 20).

Figure 21:
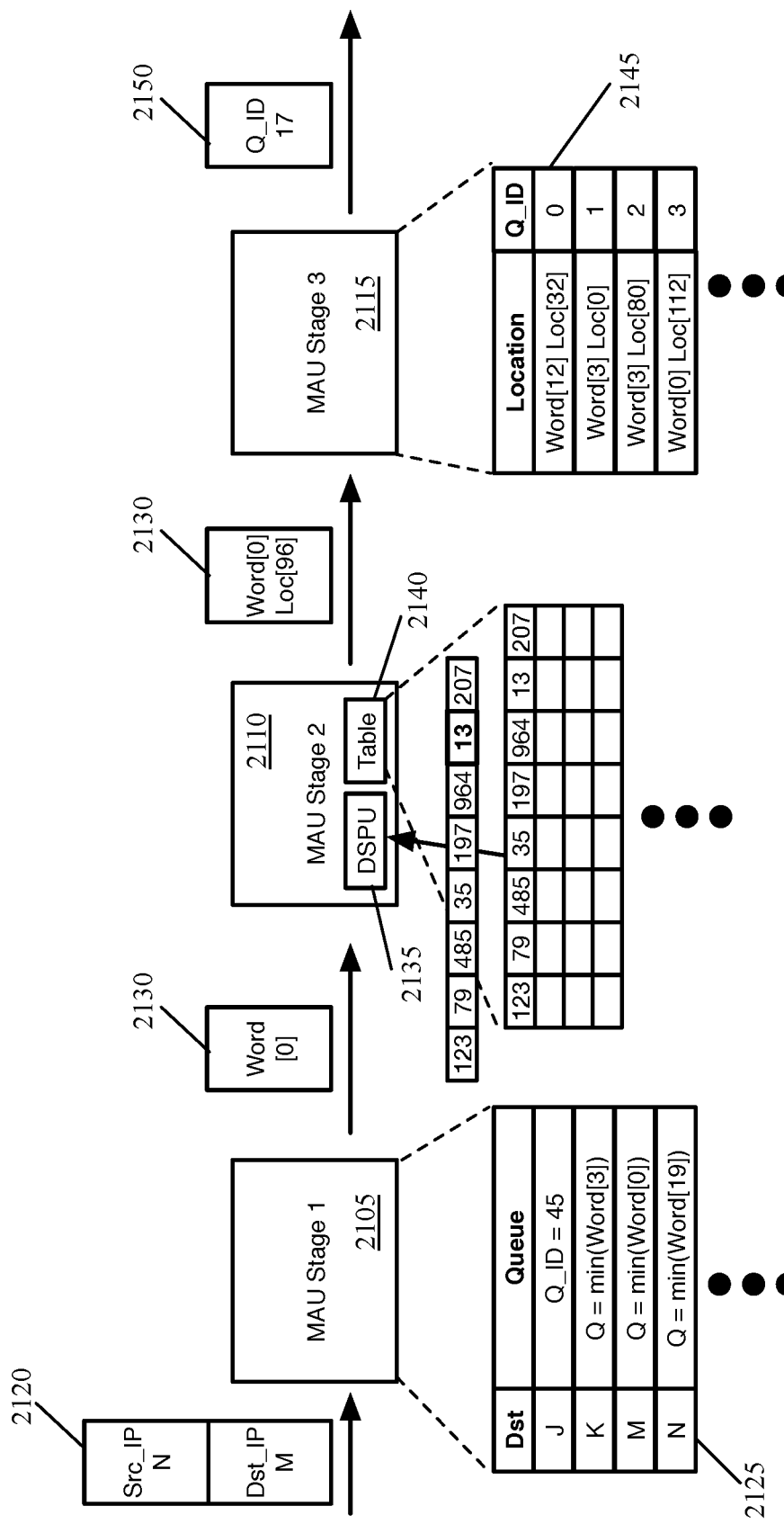
FIG. 21 conceptually illustrates three match-action stages of a packet processing pipeline that perform ingress thread operations to use queue state information from the traffic manager in order to assign an ingress packet to one of the queues.

FIG. 21 conceptually illustrates three match-action stages 2105-2115 of a packet processing pipeline that perform ingress thread operations to use queue state (in this case, queue depth) information from the traffic manager in order to assign an ingress packet to one of the queues. The first match-action stage 2105 receives the ingress PHV, including a data container 2120 that stores source and destination addresses. It should be understood that the ingress PHV would include numerous other data containers, but for simplicity only the IP addresses are shown here, as in this example the destination IP address is used to determine the queue or group of related queues to which a packet is assigned. In other embodiments, queues could be assigned based on other packet data (e.g., destination MAC address, application layer information, a combination of multiple fields, etc.). The first match-action stage 2105 may or may not be the first stage of the packet processing pipeline, and may not necessarily be the first stage to perform ingress thread operations. Other ingress thread operations such as the application of ACL rules, etc., may occur prior to queue assignment in some embodiments.

The first match-action stage 2105 maps the destination IP address stored in the PHV data container 2120 to a queue or set of queues. As in the example of FIG. 20, in FIG. 21 a conceptual mapping table 2125 is shown to represent the match entries and corresponding action entries of this match-action stage. In this case, the ingress thread match entries of the match-action stage 2105 match on the destination IP address of the ingress packet, and write either a queue identifier or a RAM word that stores a set of queues to another data container. In some cases, certain destinations will have multiple queue options (e.g., all of the queues in a LAG, or equal-cost multi-path (ECMP) options) while other destinations have only a single queue. In this case, the table 2125 indicates that destination address J is mapped to a single queue (queue 45), while destination addresses K, M, and N map to the queue with the minimum depth stored in different RAM words. In this case, the destination address M of the current packet maps to RAM word 0, which the match-action stage writes to a PHV data container 2130.

This PHV data container 2130 is passed to the second match-action stage 2110 (along with the rest of the ingress PHV, including the data container 2120). This second stage 2110 is not necessarily directly subsequent to the first match-action stage 2105, as intervening stages might perform other ingress thread or non-packet thread operations. In the second stage 2110, the DSPU 2135 is configured to read the RAM word specified by the PHV data container 2130 from the stateful table 2140 and identify the location of the minimum value within that RAM word. Thus, the DSPU 2135 reads the first RAM word (word 0), and its minimum value identification circuitry identifies the minimum value from the eight entries. The minimum value is 13, the seventh entry, so the match-action stage 2110 writes the starting bit location 96 into the PHV data container 2130 (or a separate ingress thread PHV container).

In addition to writing the bit location into the PHV data container 2130, in some embodiments the DSPU 2135 or other circuitry in the match-action stage 2110 updates the queue depth in that bit location to account for the packet added to that queue. It should be noted that, in different embodiments, the queue depth values may be transmitted by the traffic manager as a number of packets stored in the queue or a number of bits (or bytes) stored in the queue. When the queue depth identifies a number of packets, updating this value simply increments the value by 1. On the other hand, when the queue depth identifies a number of bits, the match-action stage may update the value by using the actual size of the current packet (if this is stored in the PHV) or an average approximate packet size. If numerous packets are received one after the other for a particular data flow, this updating of the queue depth will prevent all of the packets from being sent to the same queue before an update is received from the traffic manager.

While these examples show the use of a minimum value from a set of values that identify the amount of data currently stored in queues, it should be understood that in other embodiments the traffic manager could transmit to the ingress pipelines the amount of free space in each queue instead. In such embodiments, the DSPU would identify the maximum value among a set of queues rather than the minimum value. In addition, for other applications, the DSPU might identify the queue with the least available space in a group rather than the queue with the most available space.

The PHV data container 2130 with the RAM word and location is passed to the third match-action stage 2115 along with the rest of the ingress PHV. Again, this third stage 2115 is not necessarily directly subsequent to the second match-action stage 2110. The third stage 2115 maps the RAM word and starting bit location identified by the DSPU 2135 of the second match-action stage 2110 to a queue identifier, which is the traffic manager queue to which the current ingress packet will be assigned. As in the previous stages, a conceptual table 2145 is shown to represent the match entries and corresponding action entries. Here, the match entries match on the RAM word and starting bit location, and the corresponding action entries write the queue identifier to a PHV data container 2150. In the example shown in the figure, RAM word 0 and starting bit location 96 map to queue 17. This queue identifier is provided to the traffic manager along with the packet reconstructed by the deparser of the packet processing pipeline.

In the example shown in FIG. 21, the queue depths for all of the related queues for the destination address of the packet fit within a single RAM word (i.e., there are no more than eight such queues). However, in some embodiments, a particular LAG or other group of related queues may be too large for all of the corresponding queue states to fit within a single RAM word. In this case, some embodiments divide the queue state data over two or more such RAM words, and a match-action stage (after the identification of the group of queues for a packet but before the queue selection operation) selects among the RAM words. This selection may be load-balanced based on the number of queue states within each of the different RAM words. As an example, a LAG could include twenty queues, with eight queue states stored in a first RAM word, eight queue states stored in a second RAM word, and four queue states stored in a third RAM word. In this case, the selection of a RAM word could be biased (e.g., by assignment of hash ranges) to select the first RAM word 2/5 of the time, select the second RAM word 2/5 of the time, and select the third RAM word only 1/5 of the time.

Figure 22:
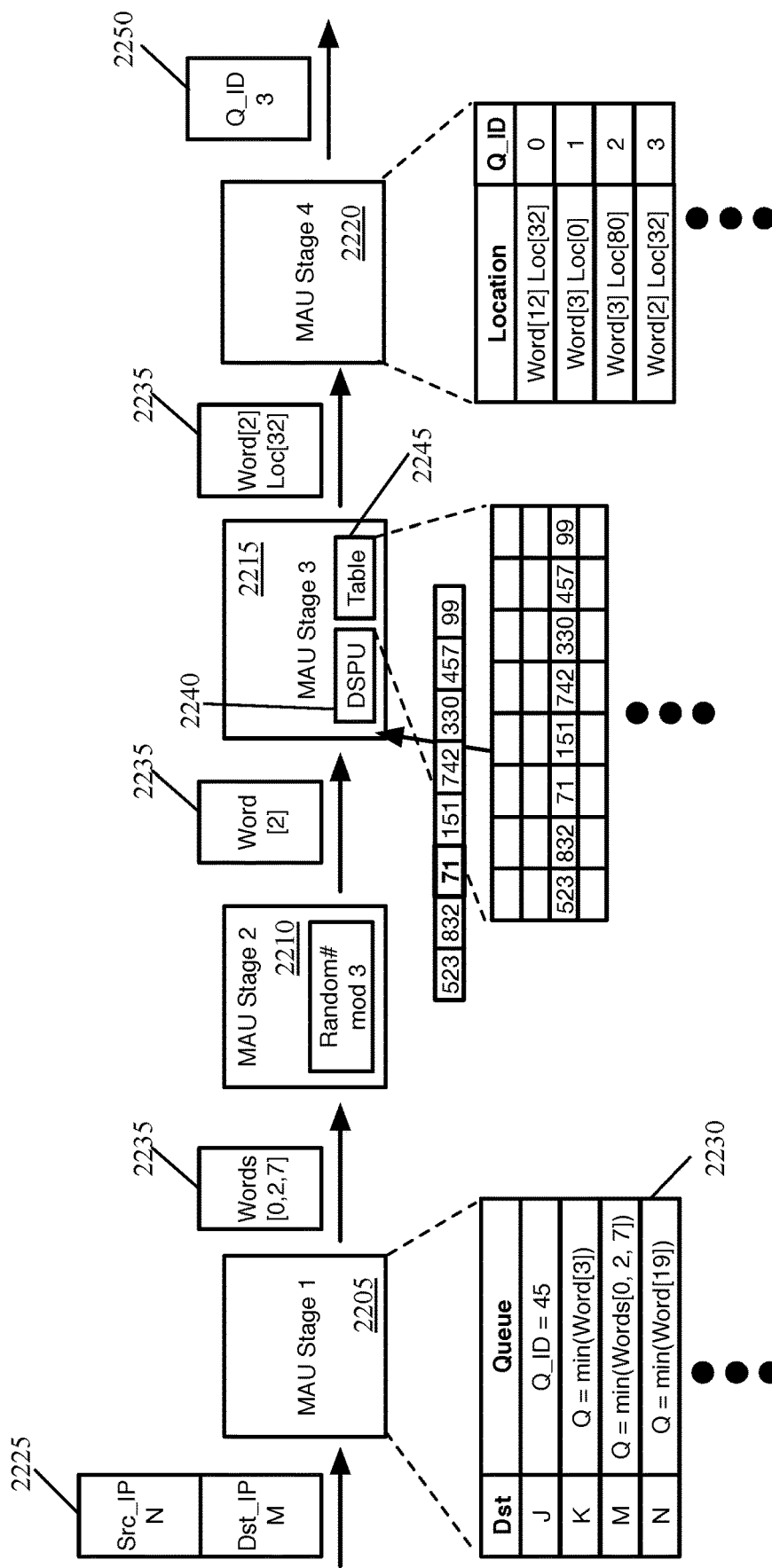
FIG. 22 conceptually illustrates four match-action stages of a packet processing pipeline that perform ingress thread operations similar to those shown in FIG. 21, but with an additional stage to select between multiple RAM words.

FIG. 22 conceptually illustrates four match-action stages 2205-2220 of a packet processing pipeline that perform ingress thread operations similar to those shown in FIG. 21, but with an additional stage to select between multiple RAM words. Thus, the first match-action stage 2205 receives the ingress packet PHV including a data container 2225 storing the destination IP address, and maps this destination address to a single queue, RAM word, or set of RAM words according to the match and action entries represented in the conceptual table 2230. In this example, the destination address M maps to a queue in any of the RAM words 0, 2, and 7. If the number of related queues for a destination is greater than the number of entries that fit within a RAM word, some embodiments divide these entries across multiple RAM words. The match-action stage 2205 stores this list of RAM word options in a PHV data container 2235 and passes this information with the rest of the ingress packet PHV to the second match-action stage 2210.

The second match-action stage 2210 selects one of the three possible RAM words. Some embodiments use a randomization mechanism to select one of the RAM words, such as a hash or other random number modulo the number of RAM words in the group. For example, some embodiments calculate a hash of a set of the packet header fields modulo the number of RAM words. In this case, the match-action stage 2210 calculates a random number modulo 3, which selects the second of the three RAM words. Other embodiments use a more carefully balanced algorithm that accounts for the number of queue states stored in each of the RAM words, if these numbers are not equal. For example, some embodiments calculate a hash (or other random number) modulo the number of queues in the group. The number of results that result in the selection of a particular RAM word is equal to the number of queue states stored in that RAM word (e.g., in the example above, 0-7 would select the first RAM word, 8-15 would select the second RAM word, and 16-19 would select the third RAM word).

The match-action stage 2210 stores the information indicating the selected RAM word in the PHV data container 2235 (or a different data container of the ingress PHV). In other embodiments, this selection operation is performed within the same match-action stage as the stateful table read operation and queue selection.

The third match-action stage 2215 operates in the same manner as the match-action stage 2110 of FIG. 21. The DSPU 2240 reads the specified RAM word from the stateful table 2245 and identifies the starting location of the lowest value of the RAM word entries. In this case, 71 is the lowest such value, in the third entry (starting bit location 32). This starting bit location is written into the PHV data container 2235 (or a different container) and provided to the fourth match-action stage 2220. The fourth match-action stage maps the RAM word and starting location to a queue identifier, as was the case in match-action stage 2115. Here, the stage 2220 outputs queue 3, which it stores in a PHV data container 2250.

In some embodiments, the various queues within a group may vary over time between valid or invalid. For example, if a particular port goes down, all of the queues that correspond to that port may become invalid, and the traffic manager can notify the ingress pipelines of this data. In some such embodiments, one of the match-action stages (prior to the queue selection operation) stores bitmasks for each RAM word that identify whether each entry for each of the RAM words is valid. The bitmask for the identified RAM word is provided to the DSPU as input, and only valid RAM word entries are considered for the minimum/maximum entry identification operation.

Figure 23:
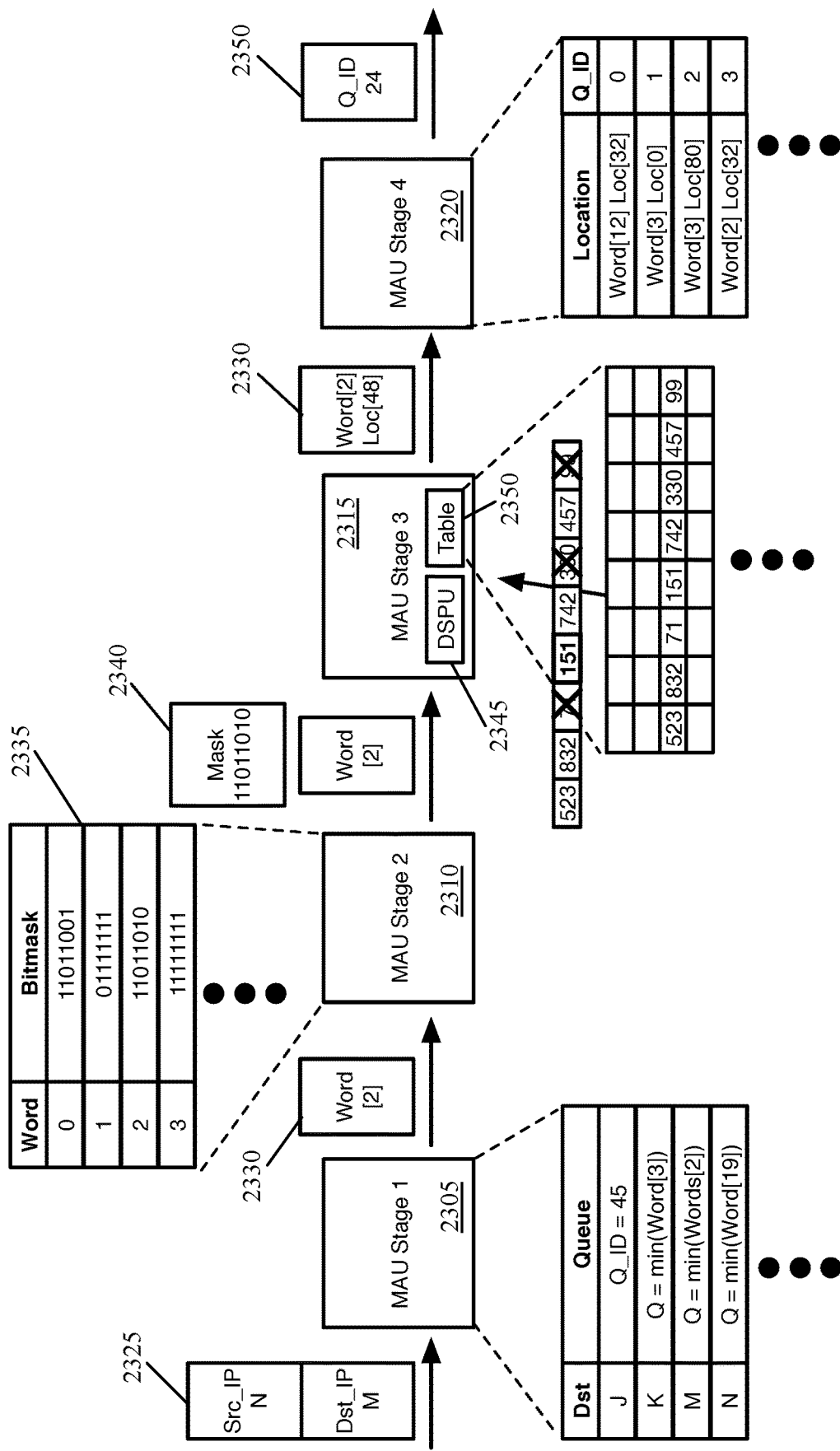
FIG. 23 conceptually illustrates four match-action stages of a packet processing pipeline that perform ingress thread operations similar to those shown in FIG. 21, but with an additional stage to incorporate a bitmask.

FIG. 23 conceptually illustrates four match-action stages 2305-2320 of a packet processing pipeline that perform ingress thread operations similar to those shown in FIG. 21, but with an additional stage to incorporate a bitmask. Thus, the first match-action stage 2305 receives the ingress packet PHV including a data container 2325 storing the destination IP address, and maps this destination address to a single queue, RAM word, or set of RAM words. In this example, the destination address M maps to the third RAM word (word 2), and the match-action stage stores this data in a data container 2330.

The second match-action stage maps the identified RAM word to a bitmask that identifies which entries of the RAM word are valid and which are invalid. As in the previous examples, a conceptual table 2335 is shown to represent the match entries that match on the RAM word and the corresponding action entries that write a bitmask into a PHV data container 2340. In other embodiments, the bitmask may be implemented using a stateful table and the DSPU to read the values from the stateful table, within the first match-action stage 2305, or within the third match-action stage 2315.

The third match-action stage 2315 operates in the same manner as the match-action stage 2110 of FIG. 21, but only considering the RAM word entries identified by the bitmask as valid. As shown, the bitmask for RAM word 2 is 11011010, so the third, sixth, and eighth entries in the table 2350, so the DSPU 2345 does not consider these entries when identifying the location of the minimum queue depth. Thus, the fourth entry (151) is identified as the minimum queue depth rather than the third entry (71, but not currently valid), and the match-action stage writes this location (RAM word 2, starting bit location 48) into the PHV data container 2330. Lastly, the fourth match-action stage 2320 maps the RAM word and starting location to a queue identifier, as in the previous examples. Here, the stage 2320 outputs queue 24, which it stores in a PHV data container 2355.

Although FIGS. 22 and 23 illustrate different options for the ingress pipeline, it should be understood that some embodiments incorporate both of these features (i.e., both selection between multiple RAM words for a particular group of related queues and bitmasks indicating which entries are currently valid for each RAM word).

As opposed to performing a specific minimum queue depth identification operation, some embodiments use the stateful queue depth data to override a queue selection decision. For example, if the ingress pipeline selects a queue for a packet (using, e.g., a hash-based selection mechanism to choose among multiple related queues), the ingress pipeline can verify that the queue is not congested past a specific queue depth. If the queue is overly congested, the ingress pipeline then re-assigns the packet to a different one of the related queues.

The queue state data may also be used by the ingress pipeline to intelligently drop packets in some embodiments. The traffic management unit may drop a packet if the packet is assigned to a queue that is too full to hold the packet (in the case, e.g., that other queues are not available to direct the packet toward its destination), but does not have a mechanism to alert either the sender or recipient of the dropped packet. However, in some embodiments the ingress pipeline can identify when a packet will be dropped because the queue to which the packet is assigned is too full. The ingress pipeline can then generate a summary signaling packet for the sender, destination, or both. This summary signaling packet of some embodiments notifies the recipient that the packet was dropped, without taking up the space of the packet. Some embodiments concatenate multiple packets from the same data flow into one packet, by including certain header fields indicative of the flow once in the concatenated packet. For instance, some embodiments generate and send a summary packet with the source and destination IP addresses and transport layer port numbers, and then also include sequence numbers for each of the dropped packets.

While the invention has been described with reference to numerous specific details, one of ordinary skill in the art will recognize that the invention can be embodied in other specific forms without departing from the spirit of the invention. In addition, a number of the figures (including FIGS. 6, 12, 16, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for an ingress packet processing pipeline of a network forwarding integrated circuit (IC), the ingress packet processing pipeline for receiving packets from a port of the network forwarding IC and processing the packets to assign different packets to different queues of a traffic management circuit of the network forwarding IC, the method comprising:
at the ingress packet processing pipeline:
receiving, at a parser, state data from the traffic management circuit, wherein the state data comprises an identifier for a particular queue and a depth of the particular queue;
storing, using at least one match-action stage of a plurality of match-action stages of the ingress packet processing pipeline, the state data in a stateful table of the ingress packet processing pipeline; and
assigning, using at least one match-action stage of a plurality of match-action stages of the ingress packet processing pipeline, a particular packet to one particular queue among a plurality of other queues of the traffic management circuit based on the state data received from the traffic management circuit and stored in the stateful table of the ingress packet processing pipeline, wherein the state data is separate from the particular packet.

2. The method of claim 1, wherein the state data received from the traffic management circuit specifies an amount of data stored in the particular queue of the traffic management circuit.

3. The method of claim 2, wherein the state data comprises an identifier for the particular queue and the amount of data stored in the particular queue, wherein storing the state data comprises storing the amount of data in an entry in the stateful table of the ingress packet processing pipeline that corresponds to the particular queue.

4. The method of claim 3, further comprising mapping the identifier for the particular queue to the entry in the stateful table that corresponds to the particular queue.

5. The method of claim 1, wherein receiving state data from the traffic management circuit comprises:
during a first clock cycle of the network forwarding IC, receiving a first set of state data relating to a first queue of the traffic management circuit; and
during a second clock cycle of the network forwarding IC, receiving a second set of state data relating to a second queue of the traffic management circuit.

6. The method of claim 5, wherein the first set of state data for the first queue is stored in the stateful table during the second clock cycle.

7. The method of claim 1, further comprising:
assigning a first packet with a particular set of characteristics to a first queue of the traffic management circuit before receiving the state data from the traffic management circuit; and
assigning a second packet with a same particular set of characteristics to a second queue of the traffic management circuit based on the received state data.

8. The method of claim 7, wherein the state data indicates that the first queue stores more packet data than the second queue.

9. The method of claim 7, wherein the first and second queues correspond to different ports of a Link Aggregation Group (LAG).

10. The method of claim 7, wherein the first and second queues correspond to different equal-cost routing paths.

11. The method of claim 1, wherein the particular packet is a first packet, the method further comprising dropping a second packet based on the received state data.

12. The method of claim 1, wherein the state data received from the traffic management circuit comprises buffer usage statistics.

13. The method of claim 1, comprising:
dropping, using at least one match-action stage of a plurality of match-action stages of the ingress packet processing pipeline, a received packet based on the particular queue being too full to hold the received packet.

14. A network forwarding integrated circuit (IC) comprising a set of packet processing pipelines and a traffic management circuit that comprises a plurality of queues, at least one of the packet processing pipelines comprising:
a parser configured to (i) extract packet data from packets received by the packet processing pipeline from a port of the network forwarding IC and (ii) receive state data from the traffic management circuit, wherein the state data comprises an identifier for a particular queue and a depth of the particular queue;
a set of match-action stages configured to (i) process the extracted packet data, (ii) store the state data received from the traffic management circuit in a stateful table, and (iii) assign a particular packet to a single particular queue among multiple other queues of the traffic management circuit based on the extracted packet data and the state data received from the traffic management circuit and stored in the stateful table, wherein the state data is separate from the particular packet; and
a deparser to reconstruct the particular packet using the processed packet data before sending the particular packet to the assigned particular queue.

15. The network forwarding IC of claim 14, wherein the state data received from the traffic management circuit is to specify an amount of data stored in the particular queue of the traffic management circuit.

16. The network forwarding IC of claim 15, wherein the state data comprises an identifier for the particular queue and the amount of data stored in the particular queue, wherein the amount of data is stored in an entry in the stateful table that corresponds to the particular queue.

17. The network forwarding IC of claim 14, wherein a first match-action stage is configured to store the state data in a stateful table and a second match-action stage is configured to assign the particular packet solely to the particular queue among multiple queues of the traffic management circuit.

18. The network forwarding IC of claim 17, wherein the first match-action stage is configured to retrieve the stored state data from the stateful table and store the state data in a data container that is passed to the second match-action stage.

19. The network forwarding IC of claim 14, wherein the parser is to receive state data relating to a first queue during a first clock cycle of the network forwarding IC and is to receive state data relating to a second queue during a second clock cycle of the network forwarding IC.

20. The network forwarding IC of claim 19, wherein the state data for the first queue is stored in the stateful table during the second clock cycle.

21. The network forwarding IC of claim 14, wherein the particular packet is a first packet, wherein the set of match-action stages are further configured to drop a second packet based on the state data received from the traffic management circuit.

* * * * *